United States Patent [19]

Inoue

[11] 4,365,133
[45] Dec. 21, 1982

[54] METHOD OF AND APPARATUS FOR ELECTROEROSIVELY MACHINING A 3D CAVITY IN A WORKPIECE

[75] Inventor: Kiyoshi Inoue, Tokyo, Japan

[73] Assignee: Inoue-Japax Research Incorporated, Yokohama, Japan

[21] Appl. No.: 190,757

[22] Filed: Sep. 25, 1980

[30] Foreign Application Priority Data

| Sep. 26, 1979 | [JP] | Japan | 54-124651 |
| Sep. 28, 1979 | [JP] | Japan | 54-124152 |
| Sep. 29, 1979 | [JP] | Japan | 54-125842 |
| Nov. 29, 1979 | [JP] | Japan | 54-155108 |
| Dec. 18, 1979 | [JP] | Japan | 54-164205 |
| Feb. 15, 1980 | [JP] | Japan | 55-17563 |
| Mar. 7, 1980 | [JP] | Japan | 55-27971 |

[51] Int. Cl.³ ............................................. B23P 1/12
[52] U.S. Cl. ............................ 219/69 M; 219/69 V; 219/69 C
[58] Field of Search ................ 219/69 V, 69 M, 69 C

[56] References Cited

U.S. PATENT DOCUMENTS

| 3,072,777 | 1/1963 | McKechnie | 219/69 V |
| 3,591,761 | 7/1971 | Bederman | 219/69 V |
| 3,673,372 | 6/1972 | Veroman et al. | 219/69 V |

FOREIGN PATENT DOCUMENTS

| 45-40405 | 12/1970 | Japan | 219/69 V |
| 1206578 | 9/1970 | United Kingdom . | |
| 1505065 | 3/1978 | United Kingdom . | |
| 1526653 | 9/1978 | United Kingdom . | |
| 1548817 | 7/1979 | United Kingdom . | |
| 1564350 | 4/1980 | United Kingdom . | |
| 2032320 | 5/1980 | United Kingdom . | |

Primary Examiner—C. C. Shaw
Attorney, Agent, or Firm—Karl F. Ross

[57] ABSTRACT

A method of and an apparatus for electroerosively machining a 3D cavity in a workpiece using a slender tool electrode, e.g. in the form of a wire or thin rod, which is generally independent of desired cavity in shape and axially juxtaposed with the workpiece to define a liquid-flooded machining gap therebetween. The slender tool electrode and the workpiece are relatively displaced three-dimensionally along mutually orthogonal three independent axes so that the slender tool electrode moves in a scanning manner over the workpiece surface while an ultrasonic vibration is imparted to the scanning slender tool electrode. A machining wear of the electrode is sensed in response preferably to the vibration signal and the wear-compensation feed is effected to axially advance the slender electrode independently of the three-dimensional cavity-forming movement to the tool electrode and the workpiece.

40 Claims, 32 Drawing Figures

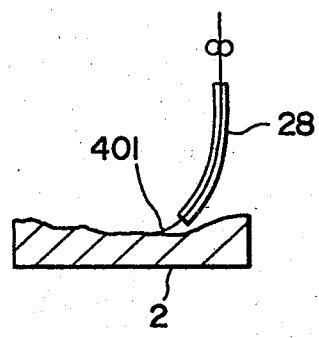
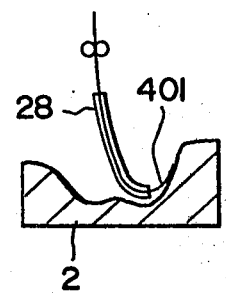
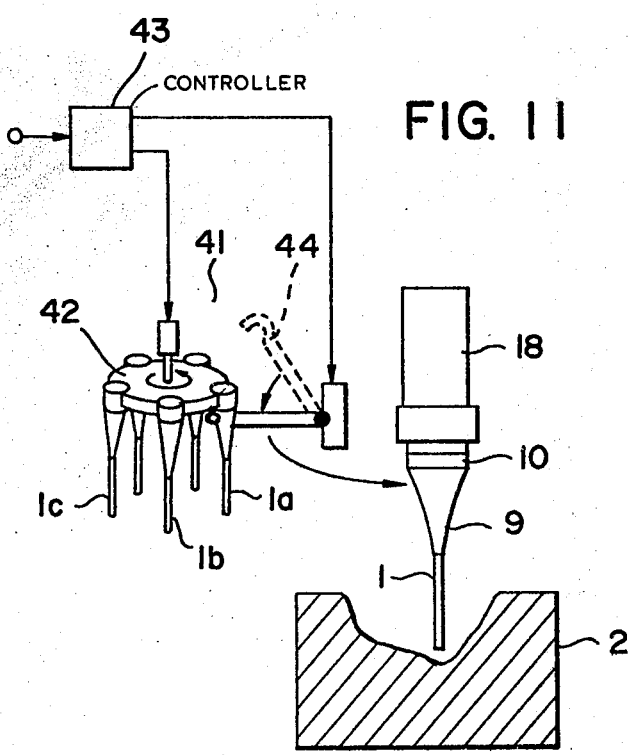

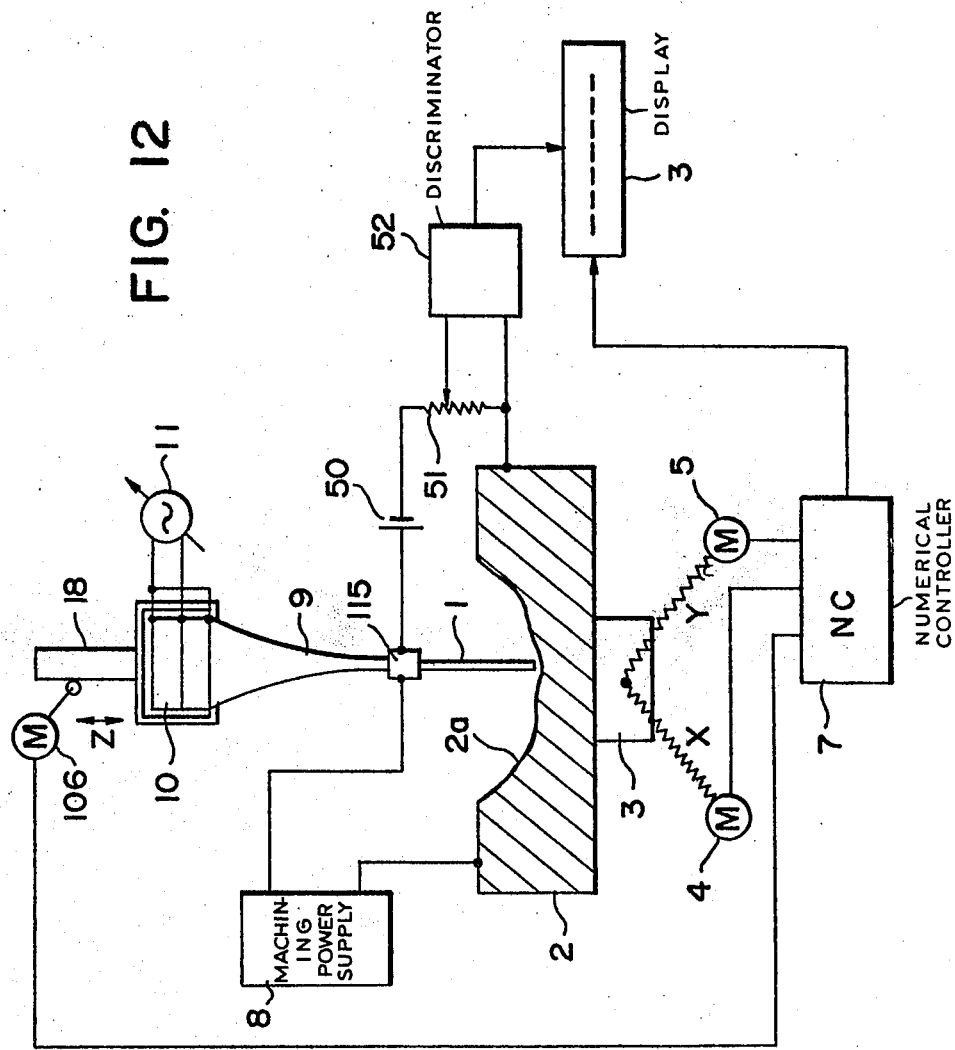

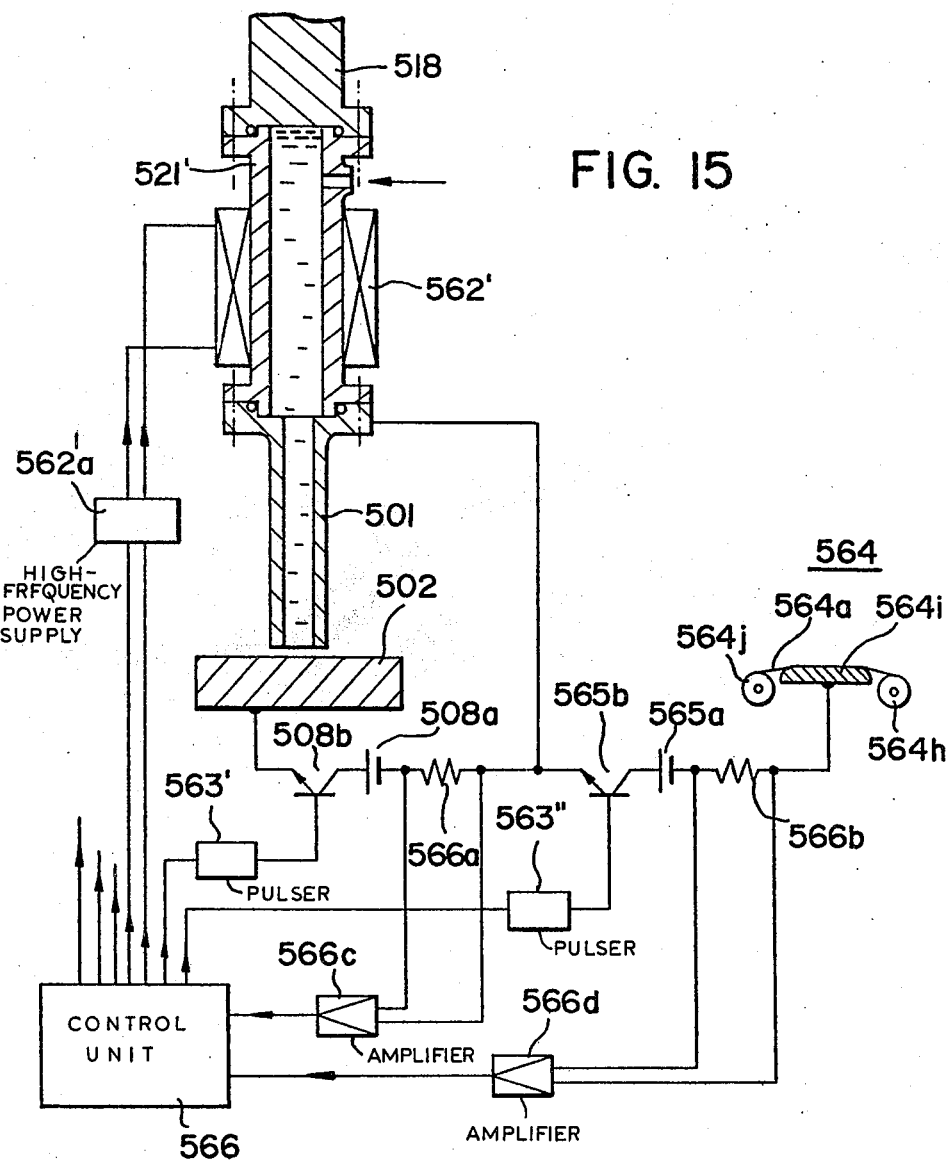

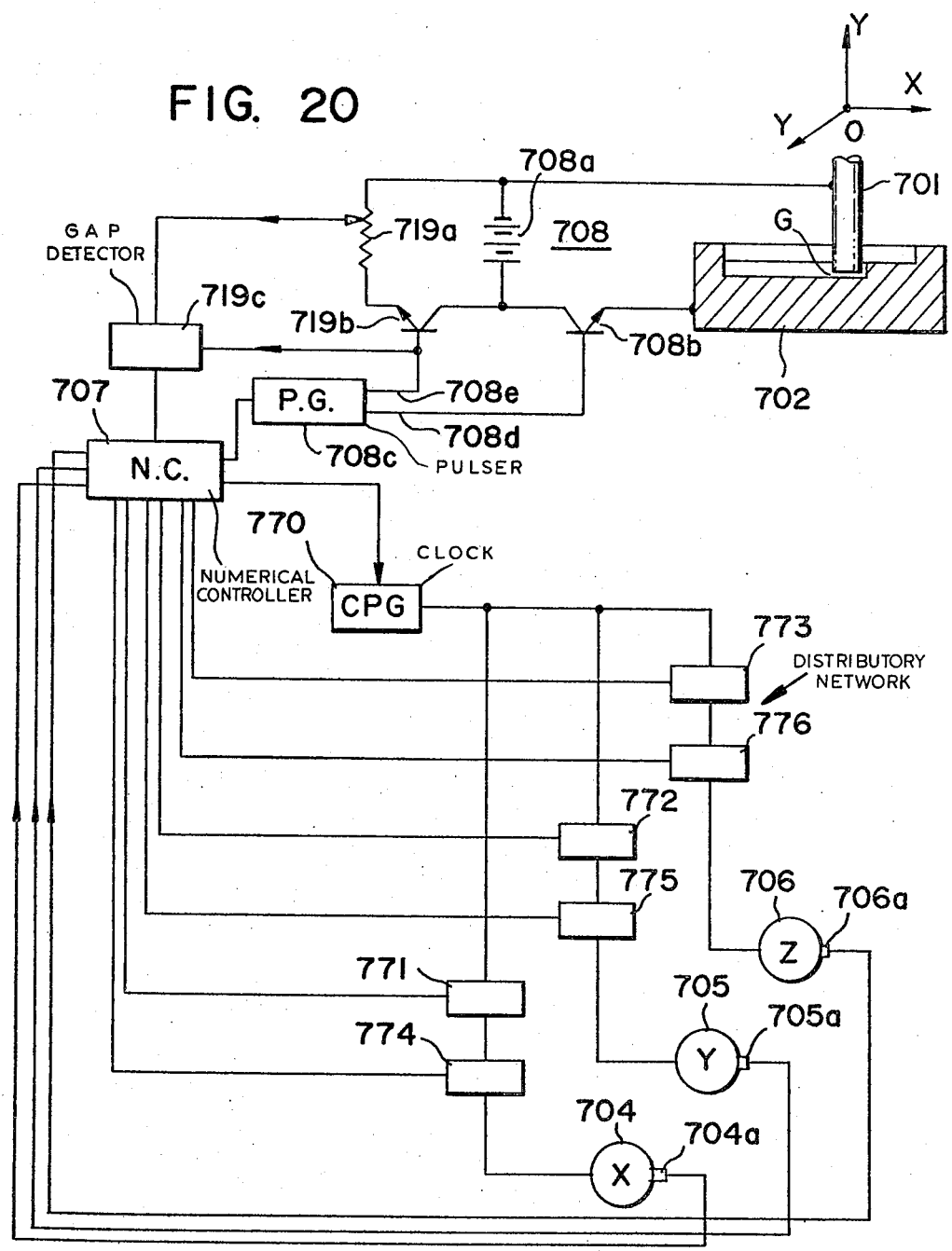

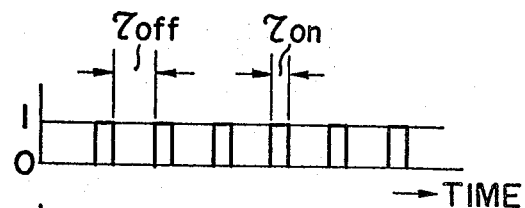
FIG. 21A
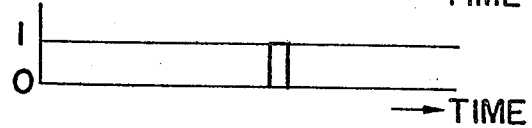
FIG. 21B
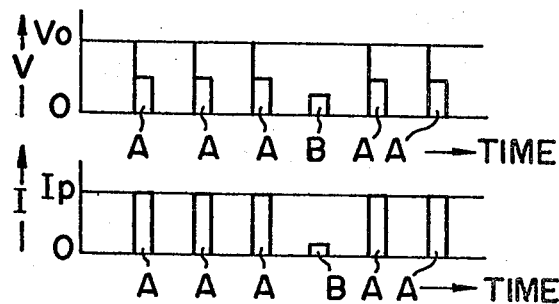
FIG. 21C
FIG. 21D
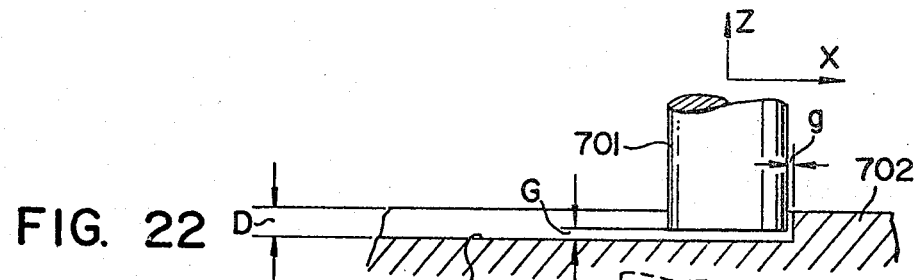
FIG. 22
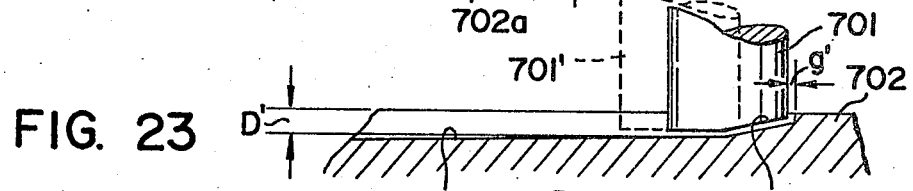
FIG. 23
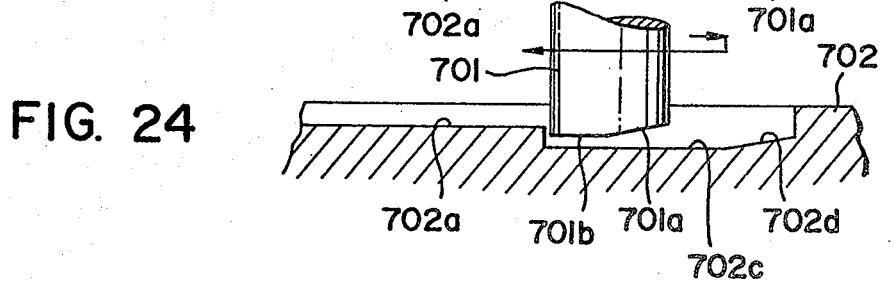
FIG. 24

METHOD OF AND APPARATUS FOR ELECTROEROSIVELY MACHINING A 3D CAVITY IN A WORKPIECE

FIELD OF THE INVENTION

The present invention relates generally to electroerosion and, more particularly, to a method of and to an apparatus for electroerosively machining a 3D (three-dimensional) cavity in a workpiece by using a slender tool electrode, e.g. a wire or rod electrode, which is generally independent in shape of the desired cavity. The term "electroerosion" and "electroerosive machining" is used herein to refer to a machining process whereby material is removed from a workpiece juxtaposed with a tool electrode by means of the actions of successive electrical discharges effected therebetween, which actions may partially include action of an electrolytic or electrochemical material removal nature.

BACKGROUND OF THE INVENTION

It has been generally accepted that the electroerosion technique, when applied to the machining of a 3D cavity in a workpiece, commonly requires a tool electrode three-dimensionally shaped to conform to the desired cavity in the workpiece. Furthermore, a multiplicity of such electrodes of identical or similar configuration and size must be prepared in order to compensate for the wear which the electrodes or tools suffer during the erosion process or in the interest of minimizing the machining time to achieve desired machined precision and surface finish. Preparation of such precision-formed and multiple electrodes is obviously time-consuming and laborious. Furthermore, the conventional sinking-type operation makes it difficult to keep the machining gap free from the debris of machined chips and other products which tend to cause machining instability.

OBJECTS OF THE INVENTION

It is accordingly a principal object of the present invention to provide an improved method of electroerosively machining a 3D cavity in a workpiece.

Another object of the invention is to provide an electroerosion method of machining a 3D cavity whereby the desired cavity can be formed in a workpiece with a simple electrode.

Still another object of the invention is to provide an electroerosion method which is capable of yielding a desired 3D cavity in a workpiece with an increased efficiency.

A further object of the invention is to provide an improved apparatus for electroerosively machining a 3D cavity in a workpiece.

A still further object of the invention is to provide an electroerosion apparatus whereby a desired 3D cavity can be formed in a workpiece with a simple electrode.

Yet a further object of the invention is to provide an electroerosion apparatus which is capable of yielding a desired 3D cavity in a workpiece with increased efficiency.

SUMMARY OF THE INVENTION

These and other objects of the invention are attained, in accordance with a first aspect thereof, by providing a method of machining a 3D cavity in a workpiece by electroerosion, which method comprises the steps of: axially juxtaposing a slender tool electrode which is generally independent in shape of the desired cavity with the workpiece across a machining gap flooded with a machining liquid; effecting a succession of electrical discharges between the tool electrode and the workpiece through the machining gap to electroerosively remove material from the workpiece; three-dimensionally displacing the tool electrode relative to the workpiece and over the surface thereof in which the cavity is to be formed while maintaining the machining gap width substantially constant between the tool electrode and the workpiece to form the desired cavity in the latter; and imparting an ultrasonic vibration to the tool electrode while the latter is being displaced three-dimensionally over and relative to the workpiece.

Specifically, a the slender tool electrode may be composed of copper, copper-containing alloy such as brass or copper-tungsten, silver-tungsten or graphite. The tool electrode is a wire or rod which should preferably be of a diameter of 0.05 to 1 mm but may be 3 to 5 mm in diameter where rough machining is satisfactory and 1 to 3 mm where medium machining is desired. The range of 0.05 to 1 mm is preferred to achieve fine finishing or where this is a requirement.

The machining liquid may be of any type commonly used in the conventional sinking-type EDM (electrical discharge machining) practice but preferably used here is water or a distilled water having a specific resistivity ranging between $1 \times 10^3$ and $5 \times 10^6$ ohm-cm.

The vibration may be imparted to the slender tool electrode in its axial or longitudinal direction and may also, as a variant form is a variant, be applied transversely to the axis thereof. The frequency of vibration is generally in a range between 1 to 100 kHz and preferably between 10 to 50 kHz and although it may also range between 100 kHz to 10 MHz. The amplitude of the vibration is generally in the range between 1 and 50 microns and, preferably between 1 and 10 microns.

In accordance with a second aspect of the invention, there is provided an apparatus for machining a 3D cavity in a workpiece by electroerosion, which apparatus comprises: a slender tool electrode which is generally independent in shape of the desired cavity and adapted to be juxtaposed with the workpiece across a machining gap flooded with a machining liquid; power supply means electrically connectable to the slender tool electrode and the workpiece for effecting successive electrical discharges therebetween through the machining gap; feed means for three-dimensionally displacing the slender tool electrode relative to the workpiece and over the surface thereof in which the desired cavity is to be formed while maintaining the width of the machining gap substantially constant between the slender tool electrode and the workpiece to form the desired cavity in the workpiece; and means for imparting an ultrasonic vibration to the slender tool electrode while the latter is being displaced three-dimensionally over and relative to the workpiece.

Preferably, detecting means is further provided which is responsive to the wear of the slender tool electrode and drive means responsive to a signal derived from the detecting means for feeding the slender tool electrode so as to compensate for any detected wear.

The wear-detecting means may respond to a change in the mode of the vibration imparted to the slender tool electrode, which change represents wear of the slender tool electrode. The change in the mode of vibration can be sensed as a change in the frequency, amplitude and- /or energy of the vibration imparted to the slender tool electrode. The reflection of the ultrasonic vibration transmitted via the machining liquid to the workpiece may also be used and a change in the echo period may then be used to indicate wear of the tool electrode.

Wear of the slender tool electrode can also be sensed by monitoring the characteristic of a sonic or ultrasonic wave generated by the machining discharge and transmitted via the machining liquid.

A wear of the slender tool electrode can also be sensed by monitoring the ratio of the number of machining discharges to the number of input machining pulses applied to the machining gap per given time period or unit time.

A plurality of different slender electrodes each carried by a tool holder may be used and stored in a magazine of an automatic tool changing (ATC) arrangement and replaced in such a manner that a given used tool electrode upon ascertainment of the wear thereof is collected to the magazine and a new electrode is mounted in the machine head to replace it.

In accordance with a further feature of the invention, means for dressing the slender tool electrode is provided so as to compensate for the wear thereof during the course of a given machining operation. The dressing means may include a dressing electrode in the form of a wire or band selectively brought into juxtaposition with the worn machining face of the tool electrode in response to a signal and a power supply for energizing the tool electrode when and the dressing electrode in a dressing position. The dressing electrode arrangement may be disposed in a work tank in which the machining of the workpiece is carried out.

The dressing of the worn tool electrode may also be effected by positively machining the unworn portion of the tool electrode so that a flat machining face is always exposed in a predetermined machining relation to the workpiece surface being machined.

BRIEF DESCRIPTION OF THE DRAWING

These and other objects, features and advantages of the present invention will become more readily apparent from the following description of certain embodiments thereof, reference being made to the accompanying drawing in which:

FIGS. 8 and 9 are schematic views diagrammatically illustrating another system of the invention in which a flexible tool electrode is guided through a positioning sleeve to make its machining face conform to the contour of a workpiece;

FIG. 11 is a schematic view diagrammatically illustrating an automatic tool changing (ATC) arrangement adapted for practice of the present invention;

FIG. 12 is a schematic view diagrammatically illustrating a further embodiment of the invention in which the gap resistance is monitored to inspect the machining accuracy afforded the workpiece during the 3D cavity forming operation;

FIG. 15 is a schematic view partly in section diagrammatically illustrating a modification of the arrangement of FIG. 14;

FIG. 20 is a schematic view diagrammatically illustrating a numerical-control (NC) system for effecting the 3D machining feed and automatically dressing of the tool electrode in accordance with a further feature of the invention;

FIGS. 21(A), (B), (C) and (D) are waveform diagrams illustrating signal pulses and machining pulses which appear in the system of FIG. 20;

FIGS. 22–24 are schematic views partly in section diagrammatically illustrating how machining wear occurs on the machining surface of a tool electrode in a 3D operation;

SPECIFIC DESCRIPTION

Figure 1:
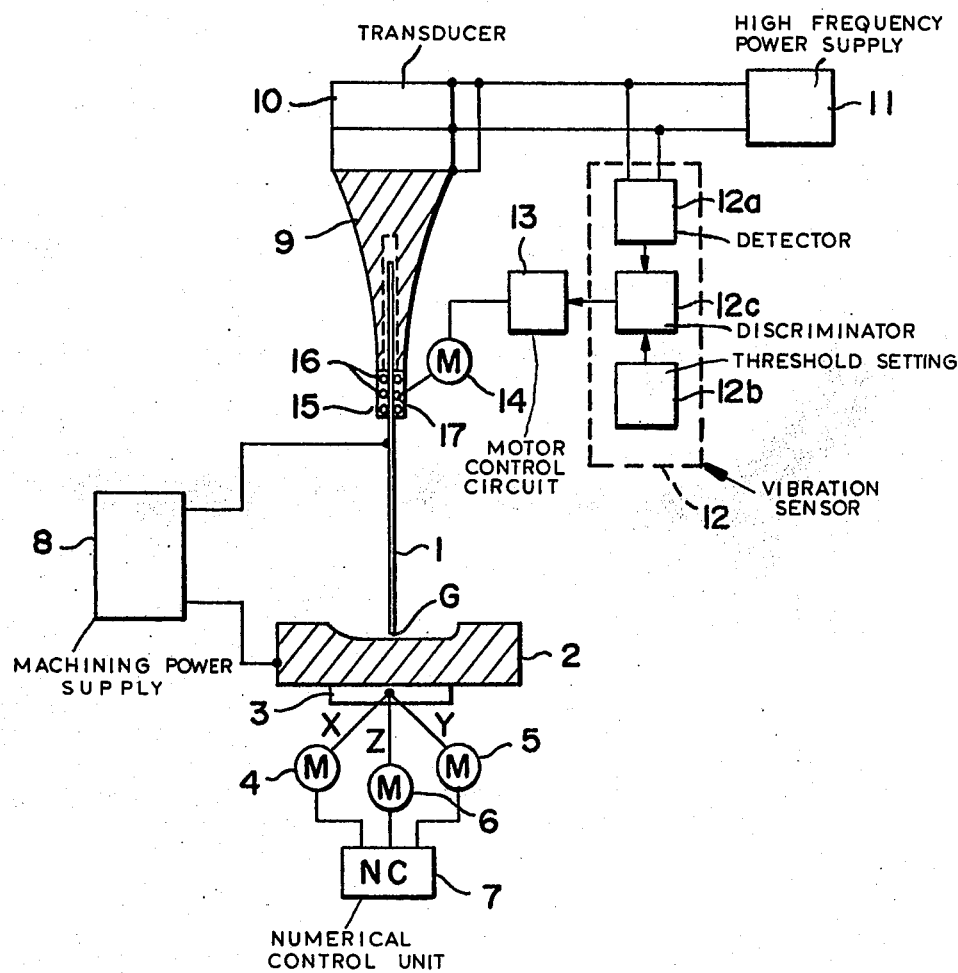
FIG. 1 is a schematic view diagrammatically illustrating a 3D electroerosion machining system incorporating a vibration head according to the invention.

Referring first to FIG. 1, a tool electrode 1 is shown juxtaposed with a workpiece 2 across a machining gap G flooded with an electroerosive machining medium supplied from a fluid source (not shown). The tool electrode 1 is here of a simple configuration which is independent of an intricate shape of the cavity 2a to be machined in the workpiece. And thus is a solid or tubular wire or rod which may, as is typical with a conventional sinking-type EDM or ECDM electrode, be composed of copper, brass, silver-tungsten, copper-tungsten or graphite and which is preferably thin, say, of a diameter or thickness ranging normally between 0.05 to 1 mm and in some cases up to 5 mm, depending upon the particular grade of machining desired. Thus, for roughing a thickness or diameter of 3 to 5 mm would be satisfactory. For medium machining and finishing the ranges of 1 to 3 mm and of 0.05 to 1 mm are desirable, respectively.

The machining medium may be any conventional EDM or ECDM liquid but is preferably water of a specific resistivity ranging from $1 \times 10^3$ to $5 \times 10^6$ ohm-cm which, especially when used in the present process, has been found to allow machining to proceed with stability and excellent results.

The workpiece 2, which may be either a virgin blank or one rough-machined previously, is carried by a worktable 3 driven by feed motors 4, 5 and 6 to provide displacement of the workpiece 2 relative to the tool electrode 1 along three mutually orthogonal axes, X, Y and Z. The motors 4, 5 and 6 are each a stepping motor or a DC motor equipped with an encoder and are driven in response to drive signals supplied from a numerical-control (NC) unit 7 in accordance with digital data preprogrammed therein and dictating a predetermined three-dimensional contouring path to be followed by relative displacement between the tool electrode 1 and the workpiece 2 and thus a desired three-dimensional contouring pattern to be machined in the workpiece 2.

A machining power supply 8, which may be a conventional EDM generator, is connected to the tool electrode 1 and the workpiece 2 to apply a series of machining pulses across the machining gap G to effect time-spaced, discrete electrical discharges between the tool electrode 1 and the workpiece 2 through the machining medium to remove material from the workpiece 2. The machining action may include partly an electrolytic or electrochemical action.

The tool electrode 1 is carried by a holder 9 which here comprises an ultrasonic vibration horn designed to propagate and amplify an ultrasonic vibration produced by a transducer 10, the latter being energized by a high-frequency power supply 11. The transducer 10 may comprise any conventional piezoelectric element (e.g. quartz, Roschelle salt, barium titanate), any conventional magnetostrictive element (e.g. nickel, aluminum-iron alloy) or an electromagnet and the vibration supply system 9, 10, 11 is adapted to vibrate the tool electrode 1 in the longitudinal direction at a frequency generally between 1 and 500 kHz and with an amplitude 1 to 50 microns, although a greater amplitude and frequency may also be used. By virtue of imparting a high-frequency vibration say, at a frequency of 10 to 50 kHz, to the tool electrode 1 while the latter three-dimensionally sweeps over the surface of the workpiece 2 to advance machining towards a desired contouring end, it has been found that the machining stability is markedly enhanced and the removal rate is increased by three to five times by comparison to the removal rate without such a vibration.

Because the discharge stricken area of the tool electrode 1 is much smaller than that of the workpiece, the electrode 1 tends to wear away at its tip portion. It has been found that the wear can be effectively detected by monitoring a change in the mode of vibration of the tool electrode 1 or a vibrational response of the workpiece 2. For example, the change in the time of arrival $\Delta t$ of an echo resulting from a vibration signal transmitted from the electrode tip and incident on the workpiece and reflected back to the electrode is generally proportional to the change in the electrode length or gap size $\Delta l$ as follows: $\Delta t = \alpha \Delta l$ where $\alpha$ is a constant. By detecting the change $\Delta t$, the change $\Delta l$ or electrode wear can be ascertained.

In the arrangement shown, a vibration sensor 12 is accordingly provided comprising a detector 12a, a preset threshold or reference setting device 12b and a comparator or discriminator 12c. The detector 12a may detect the time of echo arrival t which is compared at the discriminator 12c with a preselected reference value therefor corresponding to a given electrode length or gap size $l_0$. When a deviation is found to develop, a signal is issued by the discriminator 12c and is applied to a control circuit 13 associated with a stepping motor 14. When vibration of a frequency, say, of 10 to 500 MHz is used to vibrate the tool electrode 1, an electrode wear of 0.05 to 0.1 mm is ascertained with a high degree of accuracy.

The sensor 12 may also respond to a change in the vibration frequency and then the detector 12a is constituted by a frequency detector and the setting unit 12b has a predetermined reference setting corresponding to the frequency incoming when the tool electrode has suffered no wear and the machining gap G has an optimum spacing. The discriminator 12c is then adapted to provide a signal representing a frequency shift and is thus capable of similarly detecting the electrode wear. It is found that with an input frequency ranging between 10 and 50 kHz, the electrode wear of an amount as mentioned above give rise to a frequency shift or increase of 4 to 5 kHz.

The tool electrode 1 is supported by the holder 9 through a chuck 15 in which it is carried by guide rollers 16 and feed rollers 17 operatively connected to the motor 14. Thus, the control circuit 13 operates, in response to a signal of the discriminator 12c indicating a wear of the tool electrode, to furnish the motor 14 with a drive pulse or with drive pulses and the motor 14 in turn drives the feed rollers 17 to allow the tool electrode 1 to be advanced by a preselected number of incremental displacements through the guide way in the chuck 15, thereby compensating for the wear. The increment of displacement is set, preferably, at a small value, say, 1 micron so that an optimum gap spacing can be reestablished with a high degree of accuracy.

EXAMPLE

A ferrous workpiece is three-dimensionally machined with an arrangement as shown in FIG. 1 and as described using a copper wire or rod electrode which is vibrated at a frequency of 28 kHz and using various electrical machining conditions. It has been found that the wear compensation feed is required once for every $10^4$ discharge pulses under a wear condition to yield a surface roughness of 5 $\mu$Rmax, and once for every $10^6$ discharge pulses under a low-wear condition to yield the same roughness; once for every $5 \times 10^3$ discharge pulses under a wear condition to yield 10 $\mu$Rmax, and once for every $5 \times 10^5$ discharge pulses under a low-wear condition to yield the same roughness; and once for every $5 \times 10^2$ discharge pulses under a wear condition to yield 20 $\mu$Rmax and once for every $5 \times 10^4$ discharge pulses under a low-wear condition to yield the same roughness.

In this manner, the electrode wear compensation is achieved with a high degree of accuracy constantly to allow the single tool electrode 1 of a simple configuration to consistently perform 3D machining to yield a desired 3D cavity or pattern with a high degree of accuracy.

In order to sense a change in the mode of vibration, the amplitude may be detected as well. Then a piezoelectric element may be attached to the transducer 10 or the horn 9 to derive a signal corresponding to a change in the vibrational amplitude with a due precision. Still alternatively, a change in the energy transmitted from the source 11 to the transducer may be detected by using, for example, an ammeter. Irrespective of which parameter is detected, a sharp change is detectable and used as a signal to determine tool wear with reliability, thereby permitting wear compensation feed to be achieved with precision.

The tool electrode 1 need not be of round or circular cross section; it may be of other simple cross section such as square or triangular. Then the chucking unit 15 may include an adapter designed to hold such other cross-sectioned electrode and to be displaceably carried by the guide rollers 16 and 17 through the opening of the horn 9. The wear compensation feed is alternatively effected through a machine head (not shown) for carrying the horn 9 and the transducer 10.

Figure 2:
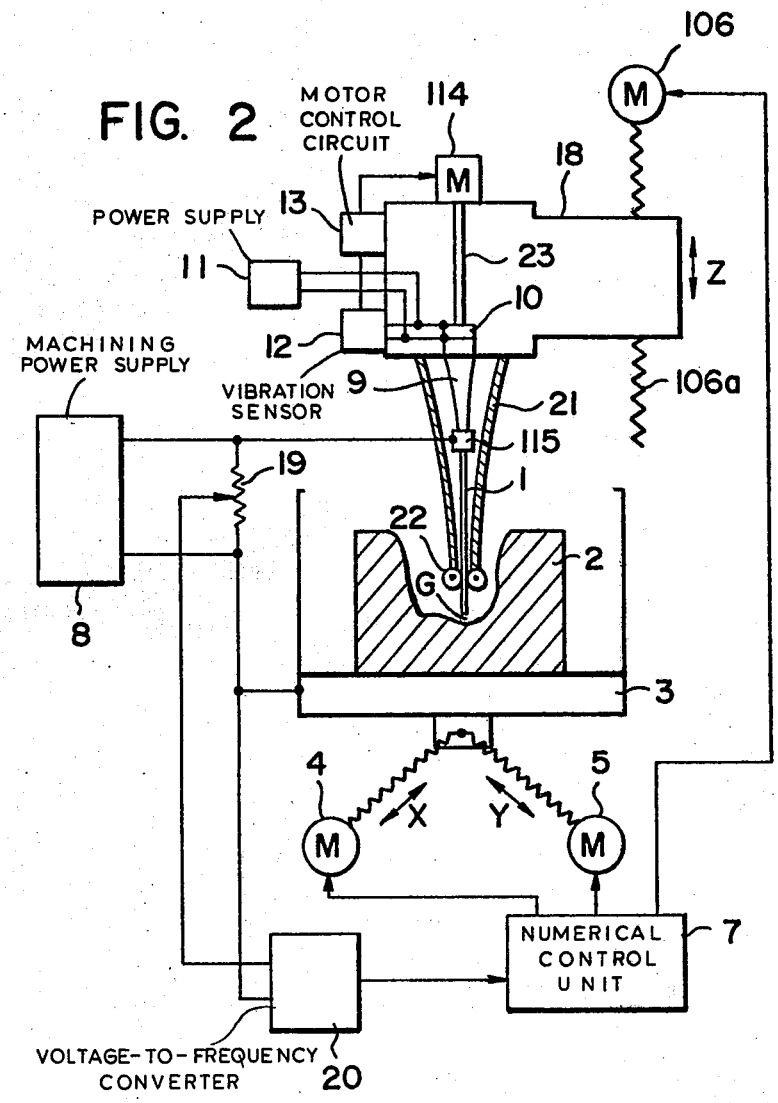
FIG. 2 is a schematic view diagrammatically illustrating another system according to the invention including a modified electrode vibration head providing a compensation feed of the worn electrode.

In the embodiment of FIG. 2 in which the parts or elements basically the same as those shown in FIG. 1 are designated by the same reference numerals, the tool electrode 1 is fixedly supported at a coupling 115 by the ultrasonic horn 9 which in turn depends displaceably from a machine head 18. In this arrangement, the head 18 is displaceable vertically on a lead screw 106a by a Z-axis motor 106 to move the tool electrode 1 along the Z-axis or in its axial direction while the worktable 3 is displaced along the X- and Y-axes by the motors feed 4 and 5, respectively, to move the workpiece 2 in an X-Y plane so that a predetermined relative contouring movement is produced between the working portion of the tool electrode 1 and the workpiece to machine a desired 3D cavity or pattern in the latter.

The machining power supply 8 is connected on one hand to the tool electrode 1 via the chucking unit 115 and on the other hand to the workpiece 2 via the worktable 3 to provide electro-erosive pulses across the machining gap G. A shunt resistor 19 is connected across the gap G in parallel with the power supply 8 to sense the gap voltage. A V-F (voltage-to-frequency) converter 20 is connected to the sensing resistor 19 to convert the voltage signal into a train of pulses whose frequency is proportional to the gap voltage. The frequency signal is then applied to the NC unit 7 so that the rate of displacement along each of the X-, Y- and Z-axes is controlled as a function of the gap voltage.

The horn 9 supporting the tool electrode 1 is shown to be received in a chamber defined by a frustoconical housing 21 attached at its upper end to the machine head 18. The housing 21 has its lower end formed with guide rolls or rollers 22 between which the wire or the like tool electrode 1 is guided out to establish the machining relationship with the workpiece 2 while being vibrated by reason of a vibration signal imparted thereto via the horn 9 from the transducer 10 energized by the power supply 11. The horn 9 is here displaceably carried on a lead screw 23 driven by a motor 114 which is again preferably a stepping motor or a DC motor equipped with an encoder. Thus, the control circuit 13 is responsive to tool wear sensed by the vibration sensor 12 to furnish the motor 114 with a drive signal. The motor 114 is driven to move the horn 9 to axially advance the tool electrode 1 and to compensate for the tool wear 1 so that a preselected length thereof remains projected from the electrode guide means 22 in a machining relationship with the workpiece 2.

Figure 3:
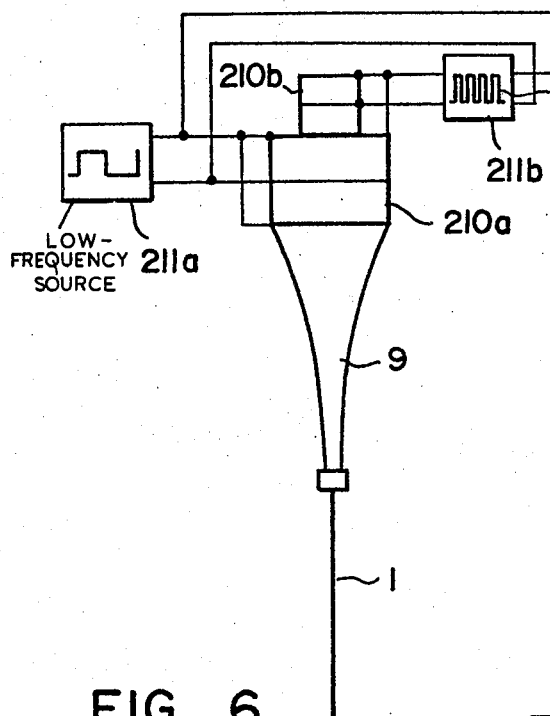
FIG. 3 is a schematic view diagrammatically illustrating a vibration head with a modified energization arrangement.
Figure 4:
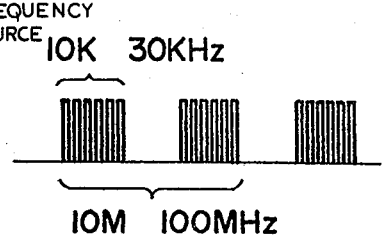
FIG. 4 is a waveform diagram of the vibration signal imparted to the slender tool electrode according to the arrangement of FIG. 3.

The ultrasonic arrangement shown in FIG. 3 includes a first transducer 210a attached to the amplifying horn 9 and energized by a first power supply 211a of a low-frequency output and a second transducer 210b attached to the first transducer and energized by a second power supply 211b of a high-frequency output. The output of the first source 211a is tied to the input of the second source 211b so that the second source 211b provides successive trains of high-frequency pulses with the trains occurring at the frequency of the low-frequency source 211a, say, at 10 to 50 kHz, and the pulses occurring at the frequency of the high-frequency source 211b, say, at 10 to 100 MHz. As a result, the wire electrode attached at the end of the amplifying horn 9 acquires vibration signals of a waveform as shown in FIG. 4 to enable detection of the tool wear with precision while enhancing the machining stability.

The resonant frequency of the vibration is expressed as follows:

$$F = \frac{n}{2l} \sqrt{\frac{pg}{r}}$$

where n is the number of nodes, l is the length of wire electrode, p is the tension of wire electrode 1, r is the weight of wire electrode per unit length and g is the gravity constant. Since p, r and g are constant and assuming that n is constant, it is seen that the vibration frequency F changes in inverse proportion to the tool length l and the tool wear in terms of change in length Δl is obtained by sensing the vibration frequency F and is compensated for.

Figure 5:
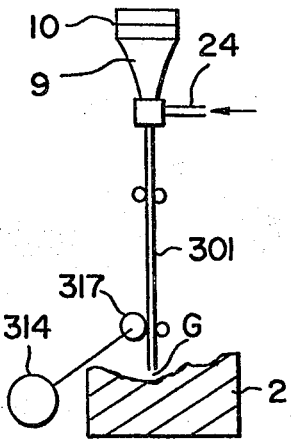
FIG. 5 is a schematic view diagrammatically illustrating a further embodiment of the invention in which the slender electrode is a tube.

FIG. 5 shows an embodiment of the invention in which the tool electrode is a tube 301 with an internal bore through which a machining liquid introduced from a supply (not shown) via an inlet 24 is forced to flow into the machining gap G. The machining liquid is preferably distilled water which is deionized from raw water so as to have a resistivity ranging, preferably, from $5 \times 10^3$ ohm-cm and is forced through the minute machining gap G between the tube end and the workpiece 2. The horn 9 here acts to impart an ultrasonic vibration of a frequency in the range, say, 1 to 100 MHz generated by the transducer 10 to the machining liquid. Thus, the ultrasonic vibration propagates at a velocity of 1500 m/sec through the machining liquid, this velocity is 2 to 3 times higher than that through the metallic body of the tubular electrode 301. By sensing a change in the echo period or any other vibration parameter as described, the wear of tool electrode 301 is detected with a high precision. The tubular electrode 301 is shown movably supported by guide rollers 317 driven by a motor 314 to advance the electrode 301 in compensation for the detected electrode wear.

In this arrangement, the machining gap G may also be made use of as a source of ultrasonic vibration imparted to the tool electrode 301. The production of intermittent electrical discharges at the machining gap provides a cyclic production of discharge pressure and hence generation of a mechanical oscillation which is propagated through the electrode 301 and can be sensed by a transducer (not shown in this FIGURE) disposed in contact with the electrode 301 to detect the electrode wear.

Figure 6:
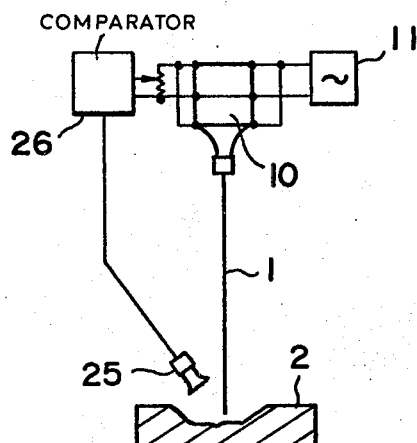
FIG. 6 is a schematic view diagrammatically illustrating another vibration-sensing arrangement according to the invention to ascertain the wear of the slender tool electrode.

In the embodiment of FIG. 6, the tool wear is detected by a combination of the transducer 10 imparting the ultrasonic vibration to the tool electrode 1 and a microphone 25 disposed in the vicinity of the machining gap. A comparator 26 is used to compare the two signals sensed by these two means to thereby indicate the tool wear.

Figure 7:
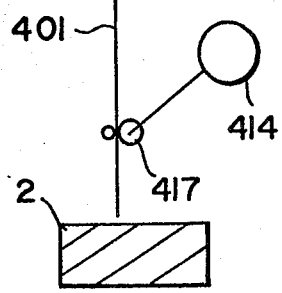
FIG. 7 is a shematic view diagrammatically illustrating another system of the invention in which the tool electrode is a continuous wire.

In the embodiment of FIG. 7, the tool electrode is a continuous wire 401 supplied from a reel 27 and guided by guide rollers 417. The guide rollers 417 are driven by a motor 414 to feed the continuous electrode wire 401 in compensation for the wear of the end portion thereof.

In the embodiments of FIGS. 8 and 9, the wire electrode 401 is guided through flexible sleeves 28 so that the end portion thereof constituting the machining tip bends in conformity with the surface contour of a workpiece 2 being machined. The sleeve 28 is fixedly connected to a vibration head or horn 9 as previously described. The bent wire electrode moves along the workpiece contour.

Figure 10:
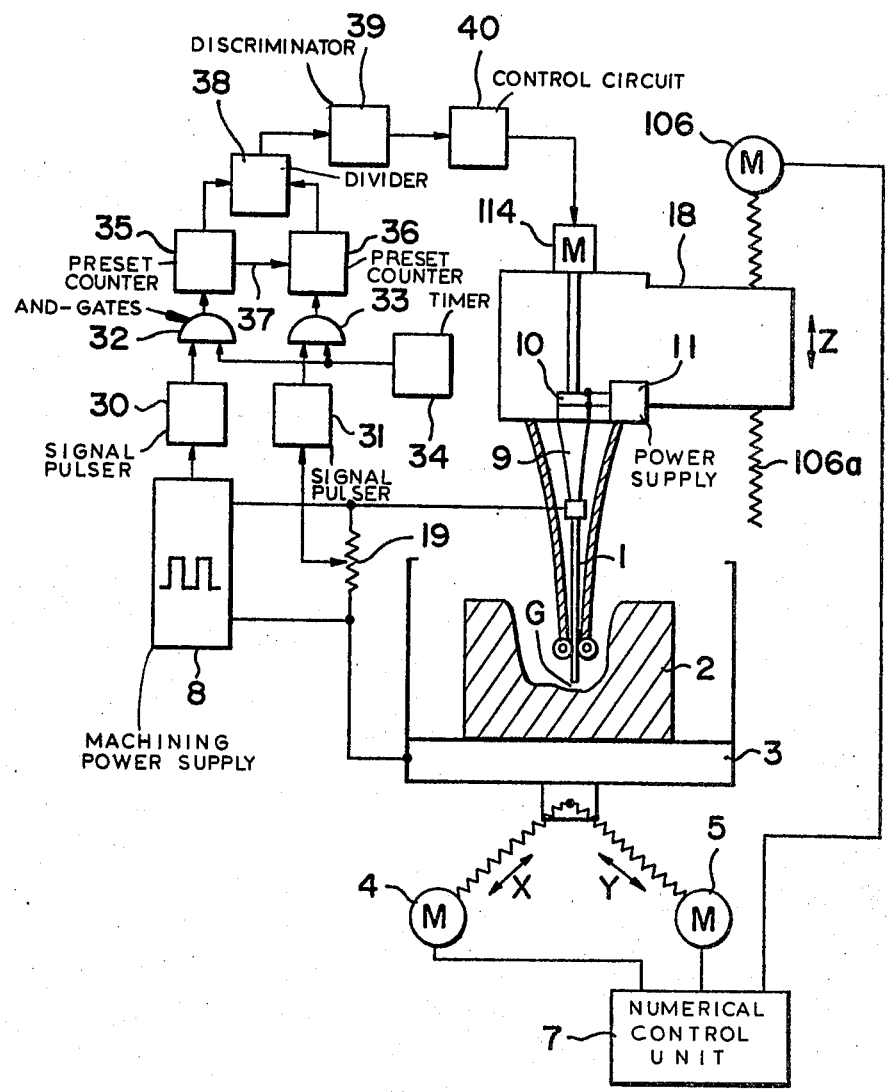
FIG. 10 is a schematic view diagrammatically illustrating a further wear-detecting system according to the invention in which the ratio of actual electrical discharges to input machining pulses in number is monitored.

An embodiment of the invention shown in FIG. 10 is shown as including an electrode assembly, vibrating head and three-dimensional machining feed unit essentially the same as described previously, particularly in connection with FIG. 2 and additionally includes an electrode-wear detecting system responsive to the rate of production of machining discharges.

The system comprises a first signal pulser 30 providing a series of first signal pulses corresponding to input machining pulses furnished from the power supply 8 to the machining gap G between the tool electrode 1 and the workpiece 2. A second signal pulser 31 is connected with the gap resistor 19 to provide a series of second signal pulses corresponding to actual machining discharge pulses produced through the machining gap G. The output of the first and second signal pulsers 30 and 31 are fed into the first inputs of AND gates 32 and 33, respectively, which have their respective second inputs fed with timing signals furnished from a timer circuit 34. The output of the AND gates 32 and 33 are fed into preset counter 35 and 36, respectively, which are adapted to furnish output signals synchronously by virtue of a coupling 37, the output signals being fed into a divider 38. The latter supplies its output to a discriminator 39 which, when the output of the divider 38 exceeds a threshold value preset therein, provides an output signal which is applied to a control circuit 40. The control circuit 40 when actuated provides a feed pulse or pulses which is/are applied to drive an electrode-wear compensation motor 114 as previously described.

In a machining operation, the tool electrode 1 which may be a wire of a thickness of 0.1 to 1 mm, or a rod or pipe of a diameter of 2 to 10 mm and which is carried by the tool head 18 is fed vertically along the Z-axis by means of the motor 106 to be positioned in a machining relationship with the workpiece 2 as shown. Then the worktable 3 is driven to feed the workpiece 2 in an X-Y plane by the X-axis motor 4 and the Y-axis motor 5. As previously described, drive pulses for the motors 4, 5 and 106 are furnished from the numerical controller 7 based upon data of desired path movements preprogrammed therein. An EDM machining fluid is supplied into the region of the machining gap G while a succession of electrical machining pulses are furnished from the power supply 8 to the tool electrode 1 and the workpiece 2. As a result, electrical discharges are produced between the tip or lateral surface proximate to the tip of the tool electrode 1 and the workpiece 2 to successively remove material from the latter.

As previously indicated, the machining fluid is preferably distilled water of a specific resistivity ranging in the order of $10^3$ to $10^5$ ohm-cm. It has been noted that with the water machining fluid of that type, a surface finish markedly superior to that obtainable with kerosene results. Thus, the Rmax is halved under an identical pulse condition. For example, with a pulse on-time $\tau$on of 1 microsecond, a pulse off-time $\tau$off of 3 microseconds and a pulse peak current Ip of 20 amperes, a surface roughness of 3 to 4 microns Rmax is obtainable with the water machining fluid.

The motors 4, 5 and 106 are each a pulse motor or a DC motor equipped with an encoder. Drive pulses may be applied to each pulse motor at a fixed frequency but preferably at a frequency controlled to vary as a function of the gap state so that the rate of feed along each axis may vary as a function of the latter as described previously.

During the machining operation, a high-frequency vibration is imparted to the tool electrode 1 by means of an ultrasonic oscillation arrangement 9, 10 and 11 as previously shown. The machining stability is thus markedly enhanced and a removal rate as high as three-times greater than without electrode vibration is obtainable.

The tool electrode 1 tends to wear from its tip portion serving as a machining face and the wear is particularly noticeable with a thinner electrode which is positioned in a machining relationship with a wide workpiece machinable surface.

The tool-wear sensing and compensation system operates as follows. The timer 34 provides periodically a timing signal which is applied to the AND gates 32 and 33 to enable them. During the enabling period, the signal pulses from the input signal pulser 30 are passed through the gate 32 and applied to the counter 35 for counting thereby. Meanwhile, the signal pulses representing gap discharge pulses issued from the pulser 31 are passed through the gate 33 and applied to the counter 36 for counting thereby. When the first counter 35 counts up a number of input or source pulses preset therein, it provides an output signal. Meanwhile, when the second counter 36 counts up a number of gap discharge pulses preset therein, it provides an output signal. These two output signal are fed to the divider 38 which then provides an output signal representing the ratio or difference of these two counter outputs.

As the electrode 1 wears, the gap spacing G between the tool electrode 1 and the workpiece 2 is widened so that machining discharges occur with progressively increasing difficulty. This causes a decrease in the number of discharges relative to a substantially fixed number of source pulses furnished from the power supply 8 per unit time. Consequently, the signal pulser 31 provides a reduced number of signal pulses which are counted by the counter 36. The divider 38 then compares the outputs of counters 35 and 36 and provides a ratio signal which is proportional to the tool wear. When the ratio exceeds a threshold value, the discriminator 39 furnishes a signal which actuates the control circuit 40 which in turn furnishes a drive pulse, the latter being applied to the compensation feed motor 114. The counters 35 and 36 are then self-cleared and become ready for a next counting cycle. At this stage, the gates 32 and 33 continue to be enabled by the timing signal from the timer circuit 34 and the input pulses and the gap discharge pulses are allowed to pass to reach the counters 35 and 36, respectively, for counting thereby. The divider 38 continues to provide the ratio signal to permit the control circuit 39 to continuingly operate to cause the motor 114 to continuingly be driven to perform the compensation feed for the tool electrode 1.

As the gap spacing is reduced as a result of wear compensation feed by the motor 114, the ratio of gap discharge pulses to source pulses will be increased. When the ratio rises above the threshold value, the discriminator 39 is deactuated to cease driving the motor 114. The gates 32 and 33 are disabled upon expiration of the timing signal from the timer circuit 34 to block the signal pulses from the pulsers 30 and 31.

FIG. 11 shows a further embodiment of the invention in which an automatic tool changer unit 41 is provided. The unit 41 comprises a tool storage magazine 42 in the form of a disk on which are removably mounted a plurality of tool electrode units 1a, 1b, 1c... with different electrode configurations which may be round, triangular, square etc and/or with different sizes, each unit having an ultrasonic vibrator assembly 9, 10 supporting the electrode body 1 and adapted to be carried by the tool head 18 as previously described. The magazine 42 is rotated in response to a signal furnished from a controller 43 successively into given tool changing positions. A tool changing arm 44 with a grip is also provided and is responsive to a signal from the controller 43 to collect from the tool head 18 a used electrode unit, say, 1a and transfer it to the magazine 42 and then to remove a next programmed electrode unit, say, 1b from the latter for mounting on the tool head 18 to permit a subsequent machining step to be to-performed thereby on the workpiece 2.

A further arrangement shown in FIG. 12 makes use of tool vibration assembly to inspect a machining accuracy upon a workpiece prior to, during and subsequent to, a given electrical machining operation. As previously described, a tool electrode 1 is securely supported at a coupling 115 by an ultrasonic horn 9 having a transducer 10 attached thereto, the transducer being energized by a high-frequency supply 11 of a variable output to permit the amplitude of a vibration imparted to the tool electrode to be variably adjusted. The horn 9 is secured to the machine head 18 which is displaceable vertically along the Z-axis by the motor 106 while the worktable 3 carrying the workpiece 2 is displaced in an X-Y plane by the motors 4 and 5. Thus, a three-dimensional machining displacement is effected by motors 4, 5 and 106 as in the embodiments already described under preprogrammed instructions of the numerical controller 7.

In this arrangement, a monitoring power supply 50 independent of the machining power supply 8 is connected to the machining gap between the tool electrode 1 and the workpiece 2 via a sensing resistor 51 of which tapped terminals are connected to a discriminator circuit 52. A pictorial display 53 is connected on one hand to the output of the discriminator circuit 52 and on the other to an output of the numerical controller 7.

Assume that a given three-dimensional machining operation has been performed on the workpiece 2. The tool electrode 1 is then vibrated at a frequency in a range, say 2 to 3 kHz or 10 to 50 kHz and with an amplitude in a range, say 0.1 to 1 micron or 5 to 10 microns by actuating the vibration assembly 9, 10 and 11 and the tool electrode 1 is caused to move over the machined contour 2a of the workpiece 2 three-dimensionally by operating the feed motors 4, 5 and 106 along the same path as has been followed during the machining operation under the command signals of the numerical controller 7. The frequency and the amplitude of the tool vibration are held constant at values depending upon a particular degree of precision of inspection desired. The vibrating tool electrode 1 will then be juxtaposed with the workpiece 2 across a minute average gap spacing which may optionally be filled with the machining fluid. The tool electrode 1 thus makes and breaks a light contact with the workpiece surface 2a and, given a fixed frequency and amplitude of vibration, the electrical resistance can be detected as a function of the neutral and hence effective position of the tool electrode 1 relative to the workpiece surface 2a. The time of approach or contact varies proportionally to the average proximity and is closely reflected by the electrical resistance monitored.

The discriminator circuit 52 may have one or more threshold levels corresponding to a desired gap spacing or spacings and hence a degree or degrees of machining precision desired and provides discriminated outputs which are applied to the pictorial display unit 53.

The display unit 53 acquires position signals corresponding to the programmed three-dimensional (X, Y, Z) machining displacement of the tool electrode 1 relative to the workpiece 2 and, corresponding to each of these positions, registers a discriminated machining precision signal received from the discriminator circuit 52.

Figure 13:
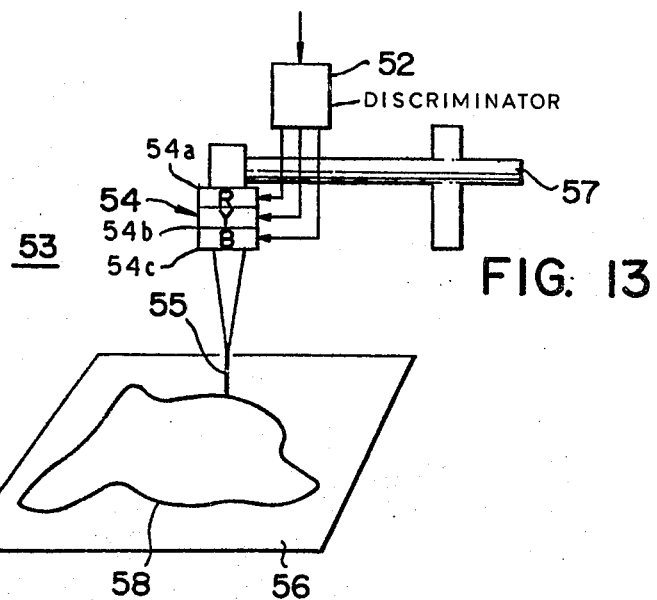
FIG. 13 is a schematic view diagrammatically illustrating a pictorial display system which can be used with the arrangement of FIG. 12 according to the invention.

FIG. 13 shows a certain form of the pictorial display unit 53 shown in FIG. 12. A recording head 54 supports a recording pen 55 in engagement with a record paper 56 which is fixed in position, the head being carried by an arm 57 which is displaced in exactly the same way as the tool electrode 1 is displaced relative to the workpiece 2 along X and Y-axes. The head 54 stores within separate chambers 54a, 54b and 54c three differently colored inks, say, red (R), yellow (Y) and blue (B) and has separate valves associated respectively therewith, the valves being actuated selectively by output signals of the discriminator circuit 52 representing different degrees of machining precision. Thus, for example, when the discriminator ascertains a gap resistance in the range between 1 and 50 ohms, the valve (R) is opened to supply the red ink to the pen 55. When a gap resistance in the range between 51 to 100 ohms is ascertained, the valve (Y) is opened to supply the yellow ink to the pen 55. When a gap resistance is in the range between 101 and 300 ohms, the valve (B) is opened to supply the blue ink to the pen 55. Thus, on the record paper 56, a curve 58 is drawn by the pen 55 corresponding to the two-dimensional relative machining path between the tool electrode 1 and the workpiece 2 and may vary locally in colors, depending upon the degrees of precision of the machined contour on the workpiece 2 from position to position. The portions of the curve drawn in blue represent the lowest degree of machining precision, the portion drawn is yellow represent the medium degree of machining precision and portions drawn in red represent the highest degree of machining precision. A highly accurate inspection of the machining precision is thus obtained on the record paper 56 and can be used to perform a post-finishing of the machined workpiece 2.

Figure 14:
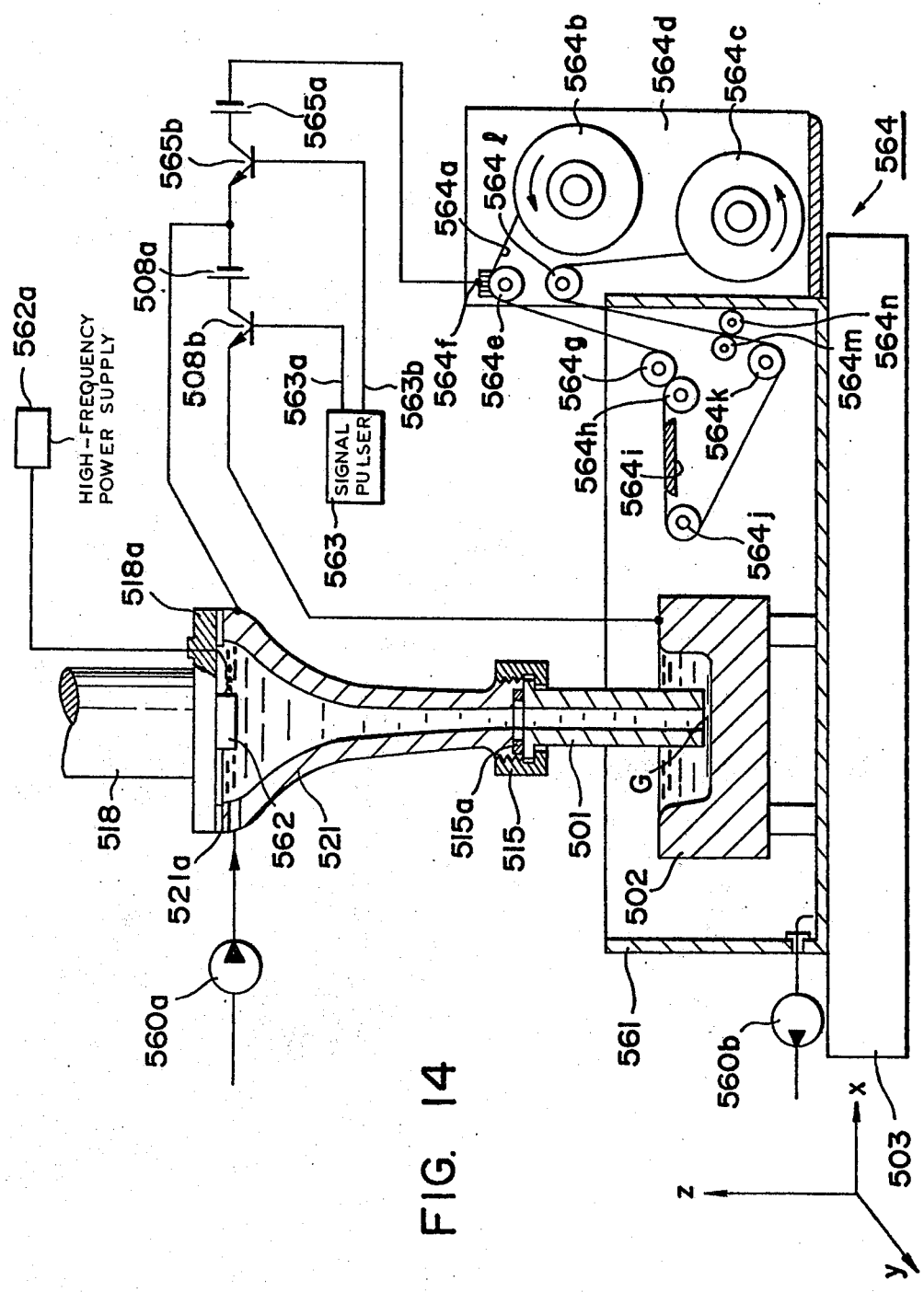
FIG. 14 is a schematic view partly in section diagrammatically illustrating an embodiment of the invention incorporating means for dressing the slender tool electrode.

FIG. 14 shows another embodiment of the invention including means for dressing the tool electrode during a given course of machining operation. In this system, a tool electrode 501 is shown secured to a tool holder 521 by means of a chuck 515 and an O ring 515a and the tool holder 521 is fixedly mounted on a stem or machine head 518 which is displaceable vertically or along the Z-axis. The tool electrode 501 and the tool holder 521 are coaxially hollow and the latter is formed with a fluid inlet 521a through which a machining liquid, preferably a distilled water of a specific resistivity previously indicated is furnished under high pressure from a supply unit including a pump 560a. The machining liquid thus passes internally through the tool holder 521 and the tool electrode 501 and is delivered under an elevated pressure in excess of 5 Kg/cm$^2$, preferably, greater than 10 Kg/cm$^2$ and more desirably greater than 25 Kg/cm$^2$, into the machining gap G formed between the latter and a workpiece 502 which is securely mounted in a worktank 561. The machining liquid collected in the worktank 561 is returned to the fluid supply unit via a pump 560b. The worktank 561 is carried on a worktable 503 which is displaceable by X-axis and Y-axis motors (not shown in this FIGURE) to displace the workpiece 502 in an X-Y plane as previously described.

An ultrasonic vibrator 562 is here attached to a plate 518a of the stem 518 and is energized by a high-frequency power supply 562a to generate an ultrasonic vibration which is transmitted via the machining liquid to the region of the machining gap G and via the tool holder 521 to the tool electrode 501.

An EDM power supply includes a DC source 508a and a power switch 508b connected in series with the tool electrode 501 and the workpiece 502. The switch 508b is energized by a signal pulser 563 via a line 563a to pulse the output of the DC source 508a so that a succession of machining pulses are applied across the machining gap G between the tool electrode 501 and the workpiece 502.

The electrode dressing unit is generally designated at 564 and includes a belt electrode 564a of a width of 1 to 2 cm and a thickness of about 0.1 mm which is axially fed from a supply reel 564b and collected onto a takeup reel 564c, the reels 564b and 564c being mounted on a bracket 564d. The path of travel of the belt electrode 564a between the supply and takeup reels 564b and 564c includes a current conducting roller 564e having a brush 564f, brake rollers 565g and 564h, reference electrode table 564i, guide rollers 564j, 564k and 564l, a capstan 564m and a pinch roller 565n. The capstan 564m is driven by a motor (not shown) to axially advance the belt electrode 564a along these elements. A dressing power supply generally designated at 565 includes a DC source 564a and a power switch 565b connected to the tool electrode 501 (via tool holder 521) and the brush 564f. The power switch 565b is energized by the signal pulser 563 via a line 563b to pulse the output of the DC source 565a, thereby supplying a succession of dressing current pulses between the tool electrode 501 and the belt electrode 564a when positioned adjacent one another for electroerosive dressing purposes.

FIG. 15 shows a modified arrangement for imparting a vibration to the tool electrode 501. Here the tool holder 521' is composed of a magnetostrictive substance and has an energizing coil 562' wound thereon, the coil being energized by a high-frequency power supply 562'a. In this arrangement, a control unit 566 is provided and operated by a numerical controller (not shown in this FIGURE) and is also responsive to a voltage drop detected at a resistor 566a in series with the machining power supply 508a and to a voltage drop detected at a resistor 566b in series with the dressing power supply 565a. Amplifiers 566c and 566d are connected between the resistor 566a and the control unit 566 and between the resistor 566b and the control unit 566, respectively. In this arrangement, the signal pulser of FIG. 14 is divided into a first pulser 563' for energizing the switch 508b and a second pulser 563'' for energizing the switch 565b.

The control unit 566 operates in response to the numerical controller and monitors through the amplifier 566c and 566d the machining current and the dressing current, respectively and acts on the three-dimensional machining drive motors, the signal pulsers 563' and 563'' and the high-frequency power supply 562a so that these individual functional elements may be operated at optimum efficiency.

Figure 16:
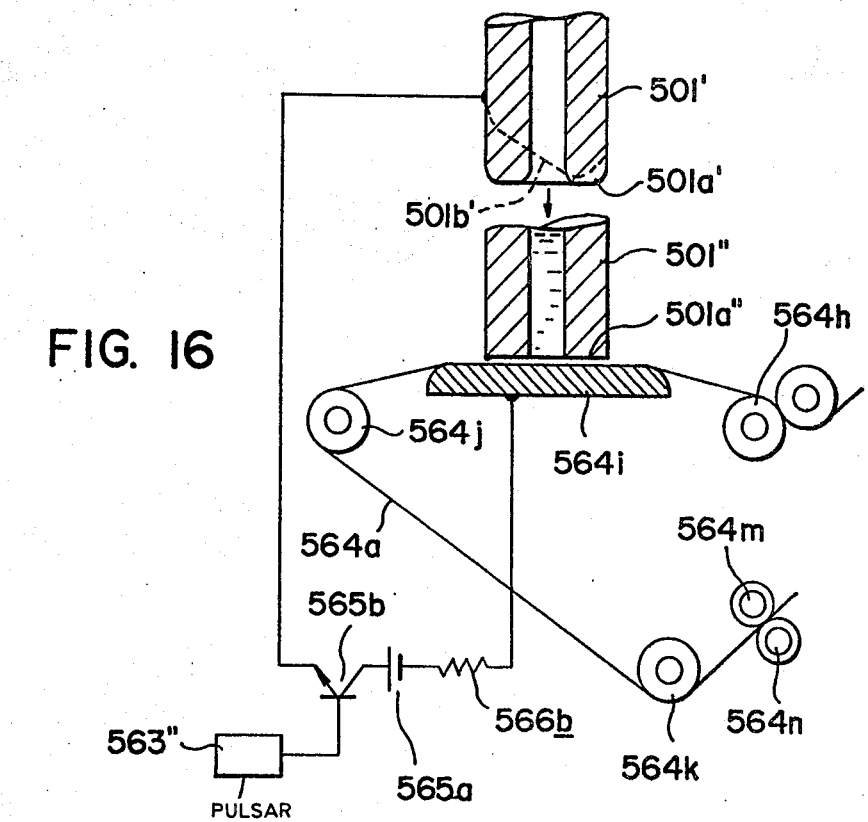
FIG. 16 is a schematic view diagrammatically illustrating the operation of the dressing arrangements of FIGS. 14 and 15.

The high-frequency vibration applied to the tool electrode is used to stabilize the machining condition as described previously and may at the same time serve to minimize, and to improve the uniformity of, the wear of the tool electrode 501. Nevertheless the wear of the tool electrode 1 and its irregularity to a certain extent is not avoidable. To perform the dressing function, the unit 564 is thus required. As shown in FIG. 16, the reference table 564i is then displaced below the tool electrode 501 while the capstan 564m is driven to axially displace the belt electrode 564a so that the latter moves in contact with the upper surface of the reference table 564i. The pulser 563'' is operated to alternately turn on and off the power switch 565b and the tool electrode 501 is displaced from the position 501' to the position 501'' and held there for a predetermined period so that the machining face 501a' thereof which has been worn irregularly is electroerosively dressed into a flat surface 501a''.

Figure 17:
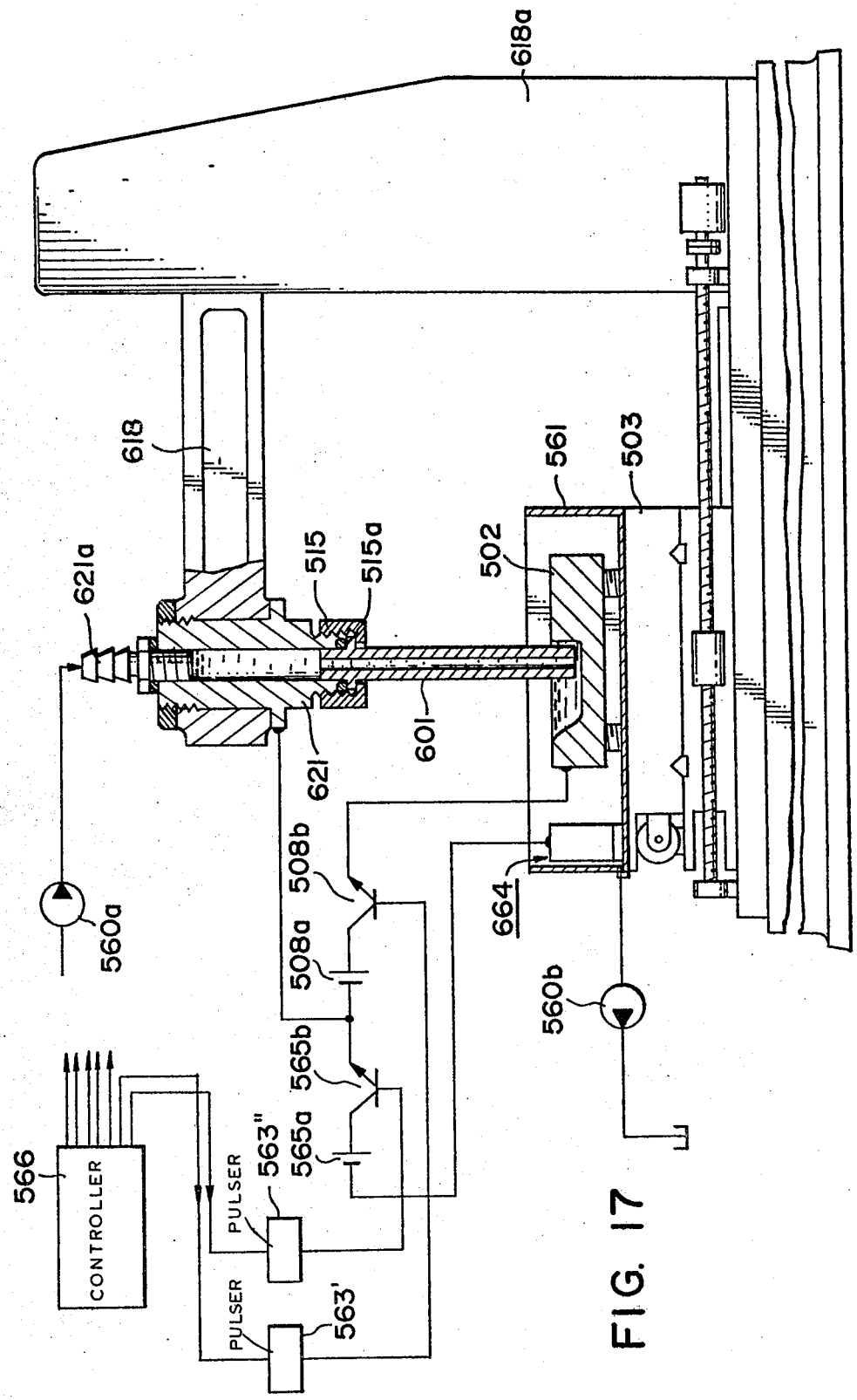
FIG. 17 is a schematic view partly in section diagrammatically illustrating a further modification of the system of FIG. 14.

In a modified arrangement shown in FIG. 17, the tool holder 621 formed with a fluid supply plug 621a and supporting the tool electrode 601 in the manner previously shown is carried by a horizontally extending arm 618 and is displaceable vertically therewith relative to a column 618a of the machine. The tool electrode 601 as in the previous arrangement is tubular and may be of an outer diameter of 0.5 mm to 10 mm.

Figure 18:
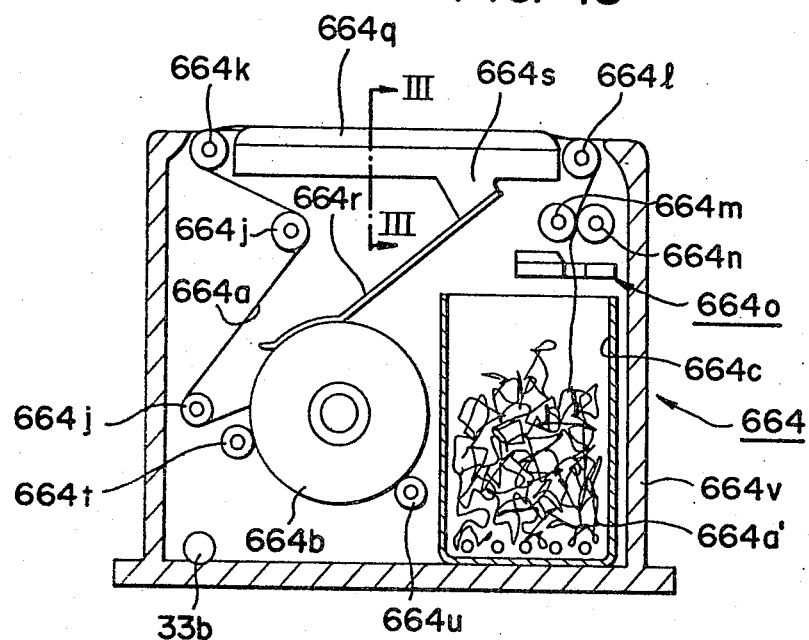
FIG. 18 is a schematic view diagrammatically illustrating a portion of the system of FIG. 17.

As in the previous arrangement an electrode dressing unit 664 is shown disposed in the worktank 561 and has a structure generally shown in FIG. 18. The unit 664 comprises a dressing electrode 664a in the form of a continuous wire or belt which is fed from a supply reel 664b and collected into a receptacle 664c upon cutting into pieces 664a' by means of a cutter 664o after traveling over guide rollers 664j, 664k and 664l, a capstan 664m and a pinch roller 664n. In the path of travel of the dressing electrode 664a there is provided a preliminary dressing chip 664g between the guide rollers 664k and 664l. A spring brake 664r is attached to a bracket portion 664s of the preliminary dressing chip 664q to apply a braking force to the reel 664b which is carried by a pair of support rollers 664t and 664u. These elements are arranged in the casing 664v.

Figure 19:
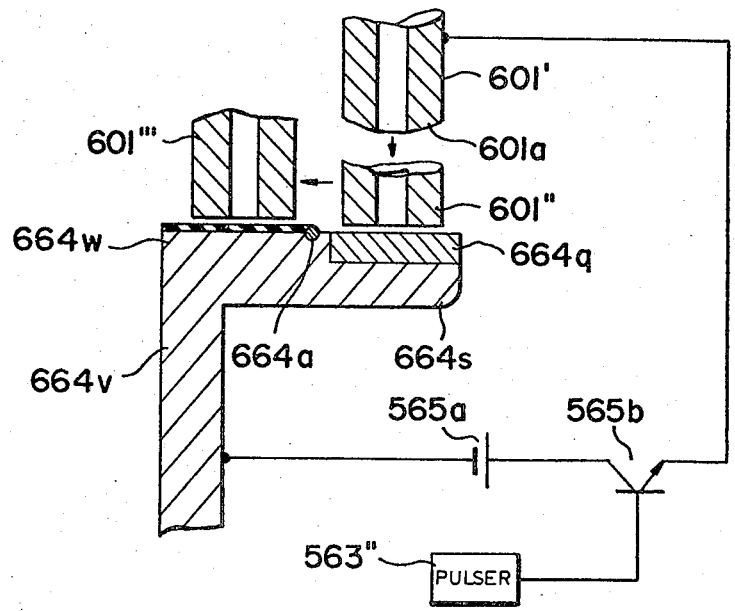
FIG. 19 is a schematic view diagrammatically illustrating the operation of the system of FIG. 17.

The casing 664v is top-open to allow installation and removal of the reel 664b and stretching the wire or belt electrode 664a over the guide elements and has the bracket 664s secured at an upper region thereof. The preliminary dressing chip 664q mounted on the bracket 664s is formed along its upper surface with a guide groove for accepting the wire or belt electrode 664a and the bracket 664s is, as shown in FIG. 19, covered over part of its upper surface with an insulating coating 664w to protect it against electrical discharge erosion.

The wire or belt electrode 664a is drawn from the supply reel 664b, guided over rollers 664j and 664k, passed through the guide groove on the bracket 664s, guided over the roller 664l, passes between the capstan 664m and the pinch roller 664n and eventually cut by the cutting unit 664o into pieces 664a' which are collected into the receptacle 664c.

The reel 664b is rotatably supported by the rollers 664t and 664u and is given an adequate braking torque through the spring brake 664r. Accordingly, with the capstan 664m driven by a motor (not shown), a tension greater than a desired minimum is kept always supplied to the wire or belt electrode 664a.

The upper face of the chip 664q and the wire or belt electrode passing through the guide groove on the bracket 664s are arranged to be precisely parallel with a horizontal reference machining plane of the machine.

The electrode dressing unit 664 is operated as follows. The worktable 503 is displaced to position the chip 664q so as to come immediately below the tool electrode 601 and the pulser 563″ is actuated. The pump 560a is driven to allow the machining liquid to be delivered to the region of the chip 664q while the arm 618 is displaced downwardly to bring the tool electrode 601 from a position 601' to a preliminary dressing position 601″ FIG. 19. The chip 664q then is capable of rough-dressing the worn machining surface 601a. Subsequently, the downward movement of the arm 618 is halted and the worktable 503 is driven to finish-dress the tool electrode 601 while it is being displaced from the position 601″ to a position 601‴, as shown in FIG. 19 over the dressing electrode 664a.

In FIG. 20 there is shown a further system for detecting the wear of a tool electrode and controlling the three-dimensional machining feed so as to compensate for the tool wear. In this system as well, the power supply generally designated at 708 comprises a DC source 708a and a power switch 708b connected in series with the tool electrode 701 and the workpiece 702. The switch 708b is controlled by a signal pulser 708c via a line 708d to pulse the output of the source 708a, thereby applying a succession of machining pulses between the tool electrode 701 and the workpiece 702. The signal pulser 708c acts also via a line 708e on a switch 719b which is connected in series with the DC source 708a and a resistor 719a. A gap detecting circuit 719c is responsive to the voltage drop across the resistor 719a when each signal pulse is applied to the switch 719b to connect the resistor 719a to the machining gap G.

The worktable (not shown in this FIGURE) carrying the workpiece 702 is displaced three-dimensionally along an X-axis, Y-axis and Z-axis by motors 704, 705 and 706 having encoders 704a, 705a and 706a equipped therewith, respectively, as described previously. A clock pulser 770 is provided to furnish a train of clock pulses which are properly distributed by a numerical controller 707 to drive the X-axis, Y-axis and Z-axis motors 704, 705 and 706 in a manner well known in the art. To this end, distributory networks 771, 772 and 773 as well as amplifying polarity-determining networks 774, 775 and 776 are provided in the respective input channels for the motors 704, 705 and 706 as shown.

The signal pulser 708c issues high-frequency signal pulses as shown in FIG. 21(A) along the line 708d and low-frequency signal pulses as shown in FIG. 21(B) along the line 708e, these separate trains of pulses being applied to the switch 708b and the switch 719b, respectively. Each signal pulse issued along the line 708e (FIG. 21(B)) is made synchronous to any one of signal pulses issued along the line 708d.

In the absence of any pulse along the line 708e, the switch 708b is turned on and off by signal pulses issuing along the line 708d to apply a series of high-voltage pulses across the tool electrode 701 and the workpiece 702, the pulses resulting in electrical discharges at the gap whose voltage and current waveforms are shown at A in FIGS. 21(C) and 21(D), respectively. In the presence of a pulse issuing along the line 708e synchronously with a pulse along the line 708d, both the switches 708d and 719b are turned on and the source 708a is shunted to by the resistor 719a. As a consequence, the gap pulse has a reduced voltage and current magnitudes as shown at B in FIGS. 21(C) and 21(D), which are incapable of bringing about a machining discharge under a normal gap condition. When, however, the gap state is unsatisfactory, an increased current develops through the machining gap G and is detected as an increased voltage drop at the sensing resistor 719a.

Figure 25:
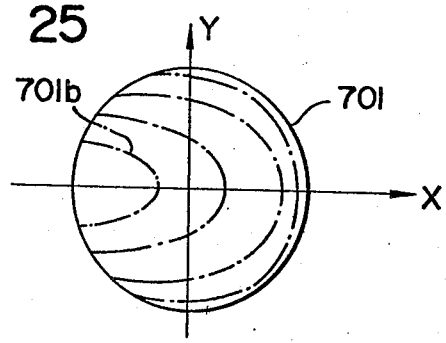
FIG. 25 is a schematic view diagrammatically illustrating contour lines of a worn electrode tip.

Referring to FIGS. 22 to 24 it is interesting to observe how the tool electrode suffers wear during an EDM operation in which the tool electrode 701 in the form of a cylinder is used to machine a groove 702a of a depth D extending in the direction of an X axis. It is seen that the lateral gap spacing g in the advance direction along the X-axis is smaller than the gap spacing G in the vertical direction or along the Z-axis and material removal from the workpiece 702 proceeds predominantly along a semi-cylindrical surface and also to a lesser extent along a base portion, of the tool electrode 701 in the advance direction, leaving a machined surface 702a therein. As a result, an irregular wear 701a with an inclination develops on the electrode surface. The configuration of this wear which develops when the tool electrode is advanced in the single direction or along the X-axis is also illustrated in FIG. 25 and becomes complex when the direction of its advance is variously altered.

Figure 26:
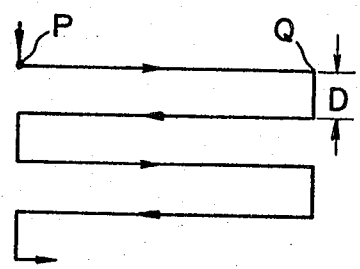
FIGS. 26–29 are schematic views illustrating various paths along X and Z axes to be followed by the tool electrode relative to the workpiece in 3D machining operations.

When the tool electrode 701 is caused to descend or move in the downward direction (along the Z-axis) at a point Q in a sequence of feed paths as shown in FIG. 26 and then to move back so that an increased depth 702c is achieved, an irregular machined inclination 702d tends to develop on the surface 702c as shown in FIG. 24. It is also seen that there is a difference in the effective gap spacing g between the state in FIG. 22 and that in FIG. 23. An irregular wear of the tool electrode is also caused on its cylindrical surface as well as on its base portion as shown.

Figure 27:
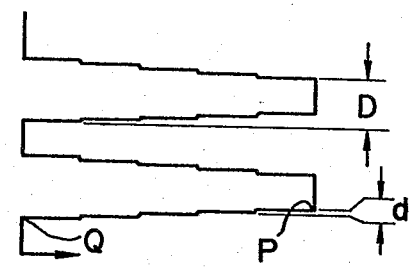

These problems are overcome by compensatorily feeding the tool electrode by a distance d while it is being advanced from a point P' to Q' in FIG. 27 in accordance with a predetermined program when a change in the machining state is not detected by the detector 719c so that the unworn portion 701b on the base of the tool electrode shown in FIG. 24 may be positively machined or worn.

Figure 28:
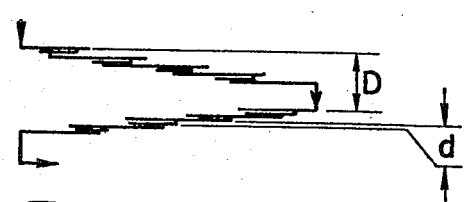
Figure 29:
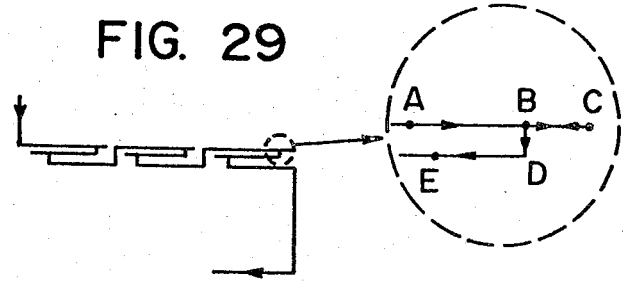

It is also advisable to adopt one of the weaving feed patterns as shown in FIGS. 28 and 29. In FIG. 29, positions A, B, C, D and E and arrows associated therewith illustrate a sequence of paths to be followed.

With reference back to FIG. 20, a control system for governing stepping motors 704 and 705 and a control system for governing the stepping motor 706 are mutually separate although associated. The former is operated under a numerical-control program to effect a contouring feed in an X—Y plane while being responsive to the detector 719c to effect the rate of contouring feed so that the gap spacing g may be properly held constant. On the other hand, the latter is operated to effect a descending motion (of a distance D) at a turning point and additionally to effect small up- and down-feeds in a uni-directional or weaving wear-compensatory movement along a Z-axis. In this manner, the wear of tool electrode 701 is highly equalized to establish the state shown in FIG. 22 as will be appreciated from the schematic diagrams of FIGS. 24 to 29.

What is claimed is:

1. A method of machining a cavity in a workpiece by electroerosion with a slender tool electrode having a machining surface contour which is of a configuration generally independent of the shape of the desired cavity, comprising the steps of:
   axially juxtaposing said slender tool electrode with the workpiece to position said machining surface contour in a spaced juxtaposition therewith across a machining gap flooded with a machining liquid;
   imparting high-frequency vibrations to said slender tool electrode to vibrationally fluctuate said machining surface contour and to dynamically enlarge the effective machining area thereof by a small size determined by the amplitude of said high-frequency vibrations;
   applying a succession of electrical pulses between said vibrating slender tool electrode and the workpiece through the machining gap to effect localized electrical discharges jumping between the workpiece and said machining surface contour brought proximal thereto by vibrational fluctuations, thereby electroerosively removing material from the workpiece against said vibrationally fluctuating machining surface contour with the enlarged effective machining area; and
   multi-axially displacing said vibrating slender tool electrode relatively over said workpiece along three coordinate axes including a pair of coordinate axes defining a plane substantially orthogonal to the longitudinal axis of said slender tool electrode and a coordinate axis substantially orthogonal to said plane while maintaining the average width of said machining gap substantially constant, thereby three-dimensionally machining said workpiece at least in part by said electrical discharges with said vibrationally fluctuating machining surface contour to form the desired cavity in the workpiece.

2. A method of machining a cavity in a workpiece by electroerosion with a slender tool electrode having a machining surface contour of a configuration which is generally independent of the shape of the desired cavity, comprising the steps of:
   providing an ultrasonic horn assembly comprising an electromechanical transducer and an amplifier horn having one end of greater cross section attached to said transducer and the other end of smaller cross section;
   supporting said slender tool electrode with said horn assembly so as to project from said other end of said horn and to extend substantially coaxially therewith;
   positioning said ultrasonic horn assembly to bring said slender tool electrode in spaced juxtaposition with the workpiece across a machining gap flooded with a machining gap;
   energizing said electromechanical transducer to impart to said slender tool electrode high-frequency vibrations of a preset frequency and with a preset amplified intensity;
   effecting a succession of electrical discharges between said vibrating slender tool electrode and said workpiece through the machining gap to electroerosively remove material from the workpiece; and
   multi-axially displacing said vibrating slender tool electrode relatively over said workpiece along three mutually independent coordinate axes including a pair of coordinate axes defining a plane substantially orthogonal to the longitudinal axis of said slender tool electrode and a third coordinate axis substantially orthogonal to said plane while maintaining the average width of said machining gap substantially constant, thereby three-dimensionally machining said workpiece at least in part by said electrical discharges to form the desired cavity in the workpiece.

3. A method of machining a cavity in a workpiece by electroerosion with a slender tool electrode having a machining surface contour which is of a configuration generally independent of the shape of the desired cavity, comprising the steps of:
   axially juxtaposing said slender tool electrode with the workpiece to position said machining surface contour in a spaced juxtaposition therewith across a machining gap flooded with a machining liquid;
   imparting to said slender tool electrode high-frequency vibrations with a preset frequency and an amplitude ranging between 1 and 50 microns to vibrationally fluctuate said machining surface contour and to dynamically enlarge the effective machining area thereof by a small size determined by the amplitude of said high-frequency vibrations;
   applying a succession of electrical pulses between said vibrating slender tool electrode and the workpiece through the machining gap to effect localized electrical discharges jumping between said workpiece and said machining surface contour brought proximal thereto by vibrational fluctuations, thereby electroerosively removing material from the workpiece against said vibrationally fluctuating machining surface contour with the dynamically enlarged effective machining area; and
   multi-axially displacing said vibrating slender tool electrode relatively over said workpiece in a plane substantially orthogonal to the longitudinal axis of said slender tool electrode and also along a coordinate axis substantially orthogonal to said plane, incrementally with an increment of displacement in the order of 1 micron while maintaining the average width of said machining gap substantially constant, thereby three-dimensionally machining said workpiece at least in part by said localized electrical discharges with said vibrationally fluctuating machining surface contour to form the desired cavity in the workpiece.

4. The method defined in claim 1, claim 2 or claim 3 wherein said slender tool electrode is composed of a substance selected from the class which consists of copper a, copper alloy, silver tungsten and graphite.

5. The method defined in claim 3 wherein said slender tool electrode is of a diameter or thickness of 0.05 to 1 mm.

6. The method defined in claim 4 wherein said slender tool electrode is of a diameter or thickness of 1 to 3 mm.

7. The method defined in claim 4 wherein said slender tool electrode is of a diameter or thickness of 3 to 5 mm.

8. The method defined in claim 4 wherein said machining liquid is water having a specific resistivity ranging between $1 \times 10^3$ and $5 \times 10^6$ ohm-cm.

9. The method defined in claim 1, claim 2 or claim 3 wherein said vibration has a frequency in the range between 1 and 100 kHz.

10. The method defined in claim 9 wherein said frequency ranges between 10 and 50 kHz.

11. A method as defined in claim 1, claim 2 or claim 3, further comprising the steps of: detecting machining wear of said slender tool electrode along said machining surface contour to produce a signal representing it and, in response to said signal, axially advancing said slender tool electrode, independently of said multi-axial displacement, so as to compensate for said wear.

12. The method defined in claim 11 wherein said wear is detected by sensing a sonic or ultrasonic wave resulting from electrical discharges at said machining gap.

13. The method defined in claim 11 wherein said wear is detected by monitoring the ratio of the number of electrical discharges to the number of input machining pulses applied to said gap per a given time period.

14. The method defined in claim 1, claim 2 or 3 wherein said vibration has a frequency in the range between 100 kHz and 100 MHz.

15. The method defined in claim 1 or 2 wherein said vibration has an amplitude in the range between 1 and 50 microns.

16. The method defined in claim 15 wherein said amplitude range not greater than 10 microns.

17. A method as defined in claim 1, further including the step of periodically during a machining operation bringing the machining surface of said tool electrode and a dressing means into juxtaposition, and causing said dressing means to thereupon dress said machining surface whereby to restore the machining surface to the desired readiness for a continuation of the machining operation.

18. A method of machining a 3D cavity in a workpiece by electroerosion, comprising the steps of:
axially juxtaposing a slender tool electrode of a configuration which is generally independent of the shape of the desired cavity with the workpiece across a machining gap flooded with a machining liquid;
effecting a succession of electrical discharges between the tool electrode and the workpiece through the machining gap to electroerosively remove material from the workpiece;
three-dimensionally displacing said tool electrode relatively over said workpiece while maintaining the width of the machining gap substantially constant between the tool electrode and the workpiece to form the desired cavity in the latter;
imparting a vibration to said tool electrode while the latter is being displaced three-dimensionally over and relative to the workpiece;
detecting a machining wear of said slender tool electrode by sensing a change in the mode of said vibration imparted to said slender tool electrode to produce a signal representing said machining wear; and
in response to said signal, axially advancing said slender tool electrode, independently of said three-dimensional displacement, so as to compensate for said wear.

19. The method defined in claim 18 wherein said change in the mode of vibration is sensed as a change in the frequency of said vibration.

20. The method defined in claim 18 wherein said change in the mode of vibration is sensed as a change in the amplitude of said vibration.

21. The method defined in claim 18 wherein said change in the mode of vibration is sensed as a change in the energy of said vibration.

22. A method of machining a 3D cavity in a workpiece by electroerosion, comprising the steps of:
axially juxtaposing a slender tool electrode of a configuration which is generally independent of the shape of the desired cavity with the workpiece across a machining gap flooded with a machining liquid;
effecting a succession of electrical discharges between the tool electrode and the workpiece through the machining gap to electroerosively remove material from the workpiece;
three-dimensionally displacing said tool electrode relatively over said workpiece while maintaining the width of the machining gap substantially constant between the tool electrode and the workpiece to form the desired cavity in the latter;
imparting a vibration to said tool electrode while the latter is being displaced three-dimensionally over and relative to the workpiece;
detecting a machining wear of said slender tool electrode by sensing an echo resulting from the reflection of said vibration by said workpiece to produce a signal representing said machining wear; and
in response to said signal, axially advancing said slender tool electrode, independently of said three-dimensional displacement, so as to compensate for said wear.

23. An apparatus for machining a 3D cavity in a workpiece by electroerosion, comprising:
a slender tool electrode which has a configuration generally independent of the shape of the desired cavity and adapted to be juxtaposed with the workpiece across a machining gap flooded with a machining fluid;
power supply means electrically connectable to said slender tool electrode and said workpiece for effecting successive electrical discharges therebetween through said machining gap;
feed means for three-dimensionally displacing said slender tool electrode relative to said workpiece and over the surface thereof in which the desired cavity is to be formed while maintaining said machining gap substantially constant between said slender tool electrode and said workpiece to form the desired cavity in the workpiece, said feed means including means for effecting said relative three-dimensional displacement of said tool electrode over said workpiece surface regardless of the occurrence of wear of the machining surface of said electrode to form a said desired cavity, and auxiliary feed means for effecting an additional feed of said electrode in a direction and by an amount such as to substantially compensate for wear occurring at said electrode machining surface during the machining operation;

means for imparting a high-frequency vibration to said slender tool electrode while the latter is being displaced three-dimensionally over and relative to said workpiece; and means for detecting during a machining operation machining wear of said tool electrode machining surface and for supplying to said auxiliary feed means a signal dependent on the amount of said machining wear, said auxiliary feed means being responsive in a wear compensating way to effect said additional feed of said tool electrode, said wear detecting means being adapted to sense, and produce in response thereto as said wear dependent signal a signal dependent on, a change in a mode of said vibration imparted to said tool electrode.

24. An apparatus as defined in claim 23 wherein said change in the mode of vibration is sensed as a change in the frequency of said vibration.

25. An apparatus as defined in claim 24 wherein said wear detecting means is adapted to sense and produce in response thereto as said wear dependent signal a signal dependent on, the ratio of the number of electrical discharges to the number of input machining pulses applied to said gap, per a given time period.

26. An apparatus as defined in claim 23 wherein said change in the mode of vibration is sensed as a change in the amplitude of said vibration.

27. An apparatus as defined in claim 23 wherein said change in the mode of vibration is sensed as a change in the energy of said vibration.

28. An apparatus for machining a 3D cavity in a workpiece by electroerosion, comprising:

a slender tool electrode which has a configuration generally independent of the shape of the desired cavity and adapted to be juxtaposed with the workpiece across a machining gap flooded with a machining fluid;

power supply means electrically connectable to said slender tool electrode and said workpiece for effecting successive electrical discharges therebetween through said machining gap;

feed means for three-dimensionally displacing said slender tool electrode relative to said workpiece and over the surface thereof in which the desired cavity is to be formed while maintaining said machining gap substantially constant between said slender tool electrode and said workpiece to form the desired cavity in the workpiece, said feed means including means for effecting said relative three-dimensional displacement of said tool electrode over said workpiece surface regardless of the occurrence of wear of the machining surface of said electrode to form a said desired cavity, said auxiliary feed means for effecting an additional feed of said electrode in a direction and by an amount such as to substantially compensate for wear occurring at said electrode machining surface during the machining operation;

means for imparting a high-frequency vibration to said slender tool electrode while the latter is being displaced three-dimensionally over and relative to said workpiece; and means for detecting during a machining operation machining wear of said tool electrode machining surface and for supplying to said auxiliary feed means a signal dependent on the amount of said machining wear, said auxiliary feed means being responsive in a wear compensating way to effect said additional feed of said tool electrode, said wear detecting means being adapted to sense and produce in response thereto as said wear dependent signal a signal dependent on, the delay in receiving echoes resulting from the reflection of said vibrations by the workpiece.

29. An apparatus for machining a cavity in a workpiece by electroerosion, comprising:

a slender tool electrode with a machining surface contour which has a configuration generally independent of the shape of the desired cavity and adapted to be juxtaposed with the workpiece to position said machining surface contour in a spaced juxtaposition therewith across a machining gap flooded with a machining fluid;

means for imparting high-frequency vibrations to said slender tool electrode to vibrationally fluctuate said machining surface contour and to dynamically enlarge the effective machining area thereof by a small size determined by the amplitude of said high-frequency vibrations;

power supply means electrically connectable to said slender tool electrode and said workpiece for passing electrical pulses between said vibrating slender tool electrode and said workpiece to effect successive localized electrical discharges between said workpiece and said machining surface contour brought proximal thereto by vibrational fluctuations, thereby electroerosively removing material from the workpiece against said contour with the enlarged effective machining area through said machining gap; and feed means for multi-axially displacing said vibrating slender tool electrode relative to said workpiece along three coordinate axes including a pair of coordinate axes defining a plane substantially orthogonal to the longitudinal axis of said slender tool electrode and a coordinate axis substantially orthogonal to said plane while maintaining the average width of said machining gap substantially constant whereby said vibrationally fluctuating machining surface sweeps three-dimensionally over the surface of said workpiece in which the desired cavity is to be formed at least in part by electrical discharges.

30. An apparatus as defined in claim 29 wherein said feed means includes means for effecting said relative multi-axial displacement of said tool electrode over said workpiece surface regardless of the occurrence of machining wear of said slender tool electrode along said machining surface contour to form a said desired cavity, said auxiliary feed means for effecting an additional feed of said electrode in a direction and by an amount such as to substantially compensate for wear occurring at said electrode machining surface contour during the machining operation.

31. An apparatus as defined in claim 30 including means for detecting during a machining operation machining wear of said tool electrode machining surface, and for supplying to said auxiliary feed means a signal dependent on the amount of said machining surface, said auxiliary feed means being responsive in a wear compensating way to effect said additional feed of said tool electrode.

32. An apparatus as defined in claim 29 wherein said wear detecting means is adapted to sense and produce in response thereto as said wear dependent signal a signal dependent on, sonic or ultrasonic waves resulting from electrical machining discharges at said machining gap.

33. An apparatus as defined in claim 29, further including dressing means for placing periodically during a machining operation in juxtaposition with the machining surface of said tool electrode, said dressing means being arranged, when so placed, to dress said machining surface of the tool electrode so as to restore it to a desired form in readiness for continuation of the machining operation.

34. An apparatus as defined in claim 33 wherein said dressing means includes an electroerosion machining means arranged to effect dressing of said machining surface of said tool electrode by an electroerosion process.

35. An apparatus for machining a cavity in a workpiece by electroerosion with a slender tool electrode of a configuration which is generally independent of the shape of the desired cavity, comprising:
- an ultrasonic horn assembly comprising an electromechanical transducer and an amplifier horn having one end of greater cross section attached to said transducer and the other end of smaller cross section adapted to support said slender tool electrode so as to project therefrom and to extend substantially coaxially with said horn;
- means for positioning said ultrasonic horn assembly to bring said slender tool electrode in spaced juxtaposition with the workpiece across a machining gap flooded with a machining liquid;
- means for electrically energizing said electromechanical transducer to impart to said slender tool electrode high-frequency vibrations of a preset frequency and with a preset amplified intensity;
- power supply means for effecting a succession of localized electrical discharges between said vibrating slender tool electrode and said workpiece through the machining gap to electroerosively remove material from the workpiece; and
- feed means for multi-axially displacing said vibrating slender tool electrode relatively over said workpiece along three mutually independent coordinate axes including a pair of coordinate axes defining a plane substantially orthogonal to the longitudinal axis of said slender tool electrode and a third coordinate axis substantially orthogonal to said plane while maintaining the average width of said machining gap substantially constant, thereby three-dimensionally machining said workpiece at least in part by said electrical discharges to form the desired cavity in the workpiece.

36. An apparatus for machining a cavity in a workpiece by electroerosion with a slender tool electrode having a machining surface contour which is of a configuration generally independent of the shape of the desired cavity, comprising:
- means for positioning said slender tool electrode to bring said machining surface contour in a spaced juxtaposition with said workpiece across a machining gap flooded with a machining liquid;
- imparting to said slender tool electrode high-frequency vibrations with a preset frequency and an amplitude ranging between 1 to 50 microns to vibrationally fluctuate said machining surface contour and to dynamically enlarge the effective machining area thereof by a small size determined by the amplitude of said high-frequency vibrations;
- power supply means for applying a succession of electrical pulses between said vibrating slender tool electrode and the workpiece through the machining gap to effect localized electrical discharges between said workpiece and said machining surface contour brought proximal thereto by vibrational fluctuations, thereby electroerosively removing material from the workpiece against said vibrationally fluctuating machining surface contour with the dynamically enlarged effective machining area; and
- feed means for multi-axially displacing said vibrating slender tool electrode relatively over said workpiece in a plane substantially orthogonal to the longitudinal axis of said slender tool electrode and also along a coordinate axis substantially orthogonal to said plane, incrementally with an increment of displacement in the order of 1 micron while maintaining the average width of said machining gap substantially constant, thereby three-dimensionally machining said workpiece at least in part by said localized electrical discharges with said vibrationally fluctuating machining surface contour to form the desired cavity in the workpiece.

37. An apparatus as defined in claim 29, claim 35 or claim 36 wherein said tool electrode has a diameter of thickness p mm, where p lies in one of the ranges $0.05 \leq p \leq 1$, $1 \leq p \leq 3$, and $3 \leq p \leq 5$.

38. An apparatus as defined in claim 29, claim 35 or claim 36 wherein said vibration imparting means is arranged, when in operation, to vibrate said tool electrode at a frequency lying in the range 1 kHz to 100 kHz.

39. An apparatus as defined in claim 29, claim 35 or claim 36 wherein said vibration imparting means is arranged, when in operation, to vibrate said tool electrode at a frequency lying in the range between 100 kHz and 10 kHz.

40. An apparatus as defined in claim 29 or claim 35 wherein said vibration imparting means is arranged to impart to said tool electrode a vibration having an amplitude in the range 1 to 50 microns.

* * * * *